(12) United States Patent
Mathea

(10) Patent No.: US 12,017,412 B2
(45) Date of Patent: Jun. 25, 2024

(54) METHOD FOR PRODUCING AT LEAST ONE SOLID-BODY LAYER IN ACCORDANCE WITH PREDETERMINED GEOMETRY DATA

(71) Applicant: dp polar GmbH, Eggenstein-Leopoldshafen (DE)

(72) Inventor: Hans Mathea, Eggenstein-Leopoldshafen (DE)

(73) Assignee: 3D Systems GmbH, Morfelden-Walldorf (DE)

( * ) Notice: Subject to any disclaimer, the term of this patent is extended or adjusted under 35 U.S.C. 154(b) by 297 days.

(21) Appl. No.: 17/604,212

(22) PCT Filed: Apr. 16, 2020

(86) PCT No.: PCT/EP2020/060756
§ 371 (c)(1),
(2) Date: Oct. 15, 2021

(87) PCT Pub. No.: WO2020/212519
PCT Pub. Date: Oct. 22, 2020

(65) Prior Publication Data
US 2022/0194004 A1 Jun. 23, 2022

(30) Foreign Application Priority Data
Apr. 17, 2019 (DE) ...................... 10 2019 002 809.0

(51) Int. Cl.
*B29C 64/277* (2017.01)
*B29C 64/241* (2017.01)
(Continued)

(52) U.S. Cl.
CPC .......... *B29C 64/277* (2017.08); *B29C 64/241* (2017.08); *B29C 64/393* (2017.08);
(Continued)

(58) Field of Classification Search
CPC ... B29C 64/277; B29C 64/393; B29C 64/241; B29C 64/209; B29C 64/106;
(Continued)

(56) References Cited

U.S. PATENT DOCUMENTS 7,291,002 B2 * 11/2007 Russell ................ B29C 64/165
425/375
9,751,259 B2 * 9/2017 Donaldson ............. B33Y 30/00
(Continued)

FOREIGN PATENT DOCUMENTS

CN 107980022 A 5/2018
CN 108093627 A 5/2018
(Continued)

*Primary Examiner* — Jeffrey M Wollschlager
(74) *Attorney, Agent, or Firm* — The Webb Law Firm

(57) ABSTRACT

In a method for producing a solid-body layer, an emitter array is provided. A support is rotationally positioned relative to the emitter array, about an axis of rotation, and material portions of a material that passes through the nozzles are applied to the support and solidified. The center point of the emitter farthest away from the axis of rotation has a first radial distance, and the emitter arranged closest to the axis of rotation has a second radial distance from the axis of rotation. A trigger signal is generated, which defines trigger points. A material dispensing signal is generated and temporarily stored, in each instance, for the individual emitters, as a function of geometry data and/or as a function of the position in which the emitter in question is arranged relative to the support, when the emitter is positioned at the corresponding trigger point. The emitters are controlled at the trigger points in such a manner that only those emitters in which the material dispensing signal is set dispense material. The angle between trigger points that are adjacent to one another corresponds to the angle that a first and a second radial line enclose between them. The first radial line runs from the axis of rotation to the intersection point
(Continued)

between a first emitter column and a reference circle line that is concentric to the axis of rotation. The second radial line runs from the axis of rotation to the intersection point between a second emitter column and the reference circle line. The radius of the reference circle line is less than the sum of 90% of the first and 10% of the second distance. The radius is greater than the sum of 10% of the first and 90% of the second distance.

14 Claims, 16 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)
(52) U.S. Cl.
  CPC ............... *B33Y 10/00* (2014.12); *B33Y 30/00* (2014.12); *B33Y 50/02* (2014.12)
(58) Field of Classification Search
  CPC ... B29C 64/112; B29C 64/171; B29C 64/176; B29C 64/205; B29C 64/245; B29C 64/264; B29C 64/228; B33Y 10/00; B33Y 30/00; B33Y 50/00; B33Y 50/02
  See application file for complete search history.

(56) References Cited

U.S. PATENT DOCUMENTS

| | | | |
|---|---|---|---|
| 10,150,247 B2 | 12/2018 | Dudley | |
| 10,611,136 B2* | 4/2020 | Menchik | B29C 64/20 |
| 11,007,713 B2* | 5/2021 | Spicer | B29C 64/171 |
| 11,072,117 B2* | 7/2021 | Hellestam | B22F 12/37 |
| 11,084,205 B2* | 8/2021 | Carlson | B29C 64/106 |
| 11,148,362 B2* | 10/2021 | Crump | B29C 64/277 |
| 11,155,036 B2 | 10/2021 | Mathea | |
| 2001/0035886 A1* | 11/2001 | Bradshaw | G11B 23/40 |
| 2004/0265413 A1* | 12/2004 | Russell | B41J 29/17 |
| | | | 425/375 |
| 2013/0264750 A1 | 10/2013 | Hofacker et al. | |
| 2016/0096319 A1 | 4/2016 | Donaldson et al. | |
| 2017/0173886 A1* | 6/2017 | Menchik | B33Y 30/00 |
| 2017/0348902 A1* | 12/2017 | Ohara | B33Y 30/00 |
| 2018/0085995 A1* | 3/2018 | Davis | B33Y 50/02 |
| 2018/0111322 A1* | 4/2018 | Mathea | B29C 64/241 |
| 2018/0207875 A1* | 7/2018 | Menchik | B33Y 10/00 |
| 2019/0084239 A1* | 3/2019 | Carlson | B29C 64/393 |

FOREIGN PATENT DOCUMENTS

| | | |
|---|---|---|
| CN | 109094022 A | 12/2018 |
| DE | 102010041284 A1 | 3/2012 |
| DE | 102012014840 A1 | 1/2014 |
| DE | 102016013317 A1 | 5/2018 |
| DE | 102016013319 A1 | 5/2018 |
| WO | 2004106041 A2 | 12/2004 |
| WO | 2016009426 A1 | 1/2016 |

* cited by examiner

METHOD FOR PRODUCING AT LEAST ONE SOLID-BODY LAYER IN ACCORDANCE WITH PREDETERMINED GEOMETRY DATA

CROSS-REFERENCE TO RELATED APPLICATIONS

This application is the United States national phase of International Application No. PCT/EP2020/060756 filed Apr. 16, 2020, and claims priority to German Patent Application No. 10 2019 002 809.0 filed Apr. 17, 2019, the disclosures of which are hereby incorporated by reference in their entirety.

BACKGROUND OF THE INVENTION

Field of the Invention

The invention relates to a method for producing at least one solid-body layer in accordance with predetermined geometry data that are stored in a memory.

Description of Related Art

In a method known from US 2004/0265413 A1, geometry data that are stored in a memory as print dots of a Cartesian coordinate system are converted to polar coordinates using a coordinate transformation device. In the method, a 3D printer is provided, which has two emitter arrays, each having multiple emitters arranged at a distance from one another and configured as nozzles that serve to dispense material portions of a liquid material to the support. The support is structured in the form of a circular disk and can be positioned rotationally relative to the emitter array, about an axis of rotation, using a drive. Using an encoder, a rotational position signal is generated for the relative position between the emitter arrays and the support.

Each emitter array has a plurality of commercially available print heads that can be incrementally displaced on a print-head carrier, radially relative to the axis of rotation, which carrier is arranged on a slide guide. In this way, irregularities during printing, which can be caused by non-functioning print heads, misfiring or incorrectly positioned emitters, can be corrected in that the position of the emitter array is changed from layer to layer. Errors that are caused by misfiring of an emitter are thereby arranged at different locations in the individual printed layers and are averaged. Furthermore, the emitter arrays can be arranged, using the print-head carriers, between a printing position, in which the emitters are arranged above the support, a diagnosis position, in which the emitters are positioned on a diagnosis device situated next to the support, and a service position, in which the emitters are positioned next to the support and next to the service position. In the service position, the emitters can be cleaned or replaced.

It is not disclosed in the published patent application, in any greater detail, how precisely the emitters of the emitter arrays are arranged and how they are controlled during printing.

The previously known method has the disadvantage that positioning inaccuracies can occur during radial displacement of the print-head carriers. Furthermore, displacement of the print-head carriers and of the numerous print heads is complicated.

Furthermore, a 3D printer is known from practice, which has a holder on which an approximately rectangular support that extends in the horizontal plane is arranged, to hold a shaped object to be produced by means of layer-by-layer material application. The printer serves for printing the shaped object in a Cartesian coordinate matrix. For the shaped object, geometry data are provided, which are assigned to print dots that lie in a Cartesian coordinate matrix.

Above the support, a print head is arranged on the holder, which head has a nozzle arrangement for dispensing material portions of a material capable of flow into the support, which arrangement will also be referred to as an emitter array hereinafter. The emitter array has a plurality of emitters configured as nozzles, which are arranged in matrix form in emitter columns offset parallel to one another and emitter rows offset parallel to one another and running transverse to the emitter columns, in an oblique-angled, straight-line coordinate system. Emitter columns that are adjacent to one another are offset relative to one another in the expanse direction of the emitter columns, in each instance, wherein the offset is less than the offset that the emitters have in the emitter columns. The emitter columns run parallel to the two short edges of the rectangular support (X axis). The emitters are arranged in such a manner that each emitter of the emitter array lies at a different X position of the Cartesian coordinate matrix, in the direction that runs parallel to the two short edges of the rectangular support. In this regard, precisely one emitter of the emitter array is assigned to every X position of the coordinate matrix, in each instance.

The emitter array can be displaced in the Y direction, parallel to the longitudinal expanse of the support, by means of a first positioning device arranged on the holder, and can be moved back and forth between the two short edges, which are spaced apart from one another. Since print dots that are directly adjacent to one another and lie on a line that runs parallel to the two short edges of the rectangular support, in the direction of the X axis, are printed using nozzles that are arranged in different emitter columns of the emitter array, the print head is positioned at different X positions during printing of the print dots of the line that lie adjacent to one another, in such a manner that the offset that the different emitter columns have in the direction of the X axis is compensated. As a result, print dots that are arranged directly next to one another in the X direction can be printed onto the support so closely offset from one another that they overlap in certain regions. Nevertheless, the emitters of the emitter array are spatially separated from one another and spaced apart from one another to such an extent that channels can be provided between the emitters, which channels connect the emitters with a reservoir for the material that passes through the nozzles, and/or electrical conductor tracks can be provided.

The emitters of the emitter array can be moved relative to the support, together with the reservoir for the material that passes through the nozzles. A fixation device is provided adjacent to the print head, which device has an ultraviolet light source for cross-linking or solidification of the material layer applied using the emitter array. The fixation device can be moved relative to the support, together with the print head.

The previously known 3D printer furthermore has a second positioning device, by means of which the support can be moved normal to the plane in which the support extends, toward the print head and away from it, in other words it can be positioned in terms of height.

For the production of a shaped object, the print head is positioned adjacent to the first edge of the support, at a predetermined distance above it. From a data memory in which geometry data for the shaped object to be produced are stored, data for the geometry of a first material layer are loaded into a fast print buffer. Afterward, the print head is continuously moved toward the opposite second edge of the support, using the first positioning device. At the same time, a material portion is dispensed onto the support at the locations where a first material layer of the shaped object is supposed to be formed, in each instance, by means of corresponding control of the individual emitters of the emitter array. Control of the individual emitters takes place as a function of the current position of the print head and as a function of the data contained in the print buffer. The material capable of flow that is applied to the support in this manner is solidified by means of irradiation with ultraviolet light, which is generated using the fixation device.

When the print head has arrived at the second edge of the support, the horizontal advancing movement of the print head is stopped, and geometry data for a further material layer to be applied to the previously produced material layer are loaded into the print buffer. Furthermore, the support is lowered, using the second positioning device, by a dimension that corresponds to the thickness of the previously produced material layer, so as to apply a further material layer to this material layer. Now the print head is continuously moved toward the first edge of the support, using the first positioning device. At the same time, a material droplet is dispensed onto the material layer that has already been completed, in each instance, by means of corresponding control of the emitters at the locations at which the further material layer is to be formed. The polymer material capable of flow that is applied to the support in this manner is once again solidified by means of irradiation with ultraviolet light, which is generated using the fixation device.

The method steps indicated above are repeated in a corresponding manner until all the material layers of the shaped object have been completed.

The method has the disadvantage that time is needed for stopping and accelerating the print-head module with its accessories at the edges of the support, and this time cannot be used for printing. This stopping and acceleration can take up as much as 50% of the total printing time in the case of smaller to medium-size printed surfaces, and therefore can significantly reduce the productivity of the method. Furthermore, the heavy print head and the relatively large and heavy parts connected with it, such as the reservoir with the supply of material capable of flow contained in it, the cable carriers, which are susceptible to wear, and the fixation device must be stopped after every completion of a material layer, and—if a further material layer is supposed to be applied—accelerated in the opposite direction. The mechanical parts of the positioning devices are subjected to stress as the result of the acceleration forces that occur in this connection, and this leads to corresponding wear of the bearings and guides of the positioning devices, and thereby impairs the precision of the printer.

The task therefore exists of indicating a method of the type stated initially, which makes it possible to rapidly produce at least one solid-body layer, in a simple manner, in accordance with geometry data stored in a memory, by means of an emitter array in which the emitters are arranged in an oblique-angled, straight-line coordinate system. During this process, greater distortions that occur as the result of the polar coordinate system used for printing, which deviates from the coordinate system of the emitter array, are supposed to be prevented, so that in spite of the use of an emitter array having emitters arranged in an oblique-angled coordinate system, an acceptable printed image is achieved.

SUMMARY OF THE INVENTION

This task is accomplished as described herein. This claim provides, in the case of a method of the type stated initially, that at least one emitter array having multiple emitters, arranged at a distance from one another and configured as material-dispensing nozzles, is provided; that for dispensing material portions of a material that passes through the nozzles, onto a support and/or a solidified material layer situated on it, at least one emitter array having multiple emitters spaced apart from one another and configured as material-dispensing nozzles is provided; that the emitter array has multiple emitter columns in which the center points of the emitters are offset relative to one another in a straight line, in each instance; that the support is rotationally positioned relative to the emitter array about an axis of rotation, and the material portions are applied to the support and/or the solidified material layer situated on it, by means of the emitters, and afterward solidified; that the center point of the emitter of the emitter array that is farthest away from the axis of rotation has a first radial distance from the axis of rotation, and the center point of the emitter arranged closest to the axis of rotation has a second radial distance from the axis of rotation; that a trigger signal is generated, which defines trigger points for the rotational position of the emitter array relative to the support; that for the individual emitters, an activation signal, in each instance, is generated and temporarily stored as a function of the geometry data stored in the memory and/or as a function of the position in which the emitter in question is arranged relative to the support when this emitter is positioned in the trigger position, in each instance, relative to the emitter array; that the emitters at the trigger points are controlled, in each instance, in such a manner that only those emitters in which the activation signal that was previously temporarily stored is set dispense material; that the angle between adjacent trigger points is selected in such a manner that it corresponds to the angle that a first radial line and a second radial line enclose between themselves; that the first radial line runs from the axis of rotation to the intersection point between a first emitter column and a reference circle line concentric to the axis of rotation, and the second radial line runs from the axis of rotation to the intersection point between a second emitter column adjacent to the first emitter column in the circumferential direction of the axis of rotation and the reference circle line; that the radius of the reference circle line is less than the sum of 90% of the first radial distance and 10% of the second radial distance, and wherein the radius of the reference circle line is greater than the sum of 10% of the first radial distance and 90% of the second radial distance. A material that passes through the nozzles is understood to be a liquid, paste-like or powder-type medium that can be applied to the support through a nozzle, in particular by means of a pressure effect on the medium.

The task stated above is also accomplished with the characteristics of claim 2. This claim provides, in the case of a method of the type stated initially, that a container is provided, in which at least one material layer composed of a liquid, paste-like or powder-type material is applied to a support; that for irradiation of the material with a radiation that solidifies the material, an emitter array having multiple radiation emitters spaced apart from one another and facing the material layer is provided, wherein the emitter array has multiple emitter columns in which the center points of the emitters are offset from one another in a straight line, in each instance, wherein the support is rotationally positioned, relative to the emitter array, about an axis of rotation, and the radiation is directed onto the material layer, by means of the emitters, in such a manner that the material is solidified in at least one irradiation location; that the center point of the emitter of the emitter array that is farthest away from the axis of rotation has a first radial distance from the axis of rotation, and the center point of the emitter arranged closest to the axis of rotation has a second radial distance from the axis of rotation; that a trigger signal is generated, which defines trigger points for the rotational position of the emitter array relative to the support; that for the individual emitters, an activation signal is generated and temporarily stored, as a function of the geometry data stored in the memory and/or as a function of the position in which the emitter in question is arranged relative to the support, when this emitter is positioned at the trigger point, in each instance, relative to the emitter array; that the emitters at the trigger points are controlled, in each instance, in such a manner that only those emitters in which the activation signal that was previously temporarily stored emit radiation; that the angle between adjacent trigger points is selected in such a manner that it corresponds to the angle that a first radial line and a second radial line enclose between them; that the first radial line runs from the axis of rotation to the intersection point between a first emitter column and a reference circle line concentric to the axis of rotation, and the second radial line runs from the axis of rotation to the intersection point between a second emitter column that is adjacent to the first emitter column, in the circumferential direction of the axis of rotation, and the reference circle line; that the radius of the reference circle line is less than the sum of 90% of the first radial distance and 10% of the second radial distance, and that the radius of the reference circle line is greater than the sum of 10% of the first radial distance and 90% of the second radial distance. The invention can therefore also be used in the case of a method that is similar to the stereolithography method. The difference is that the laser beam or the LCD/LED projectors of the stereolithography method is/are replaced by the emitter array as described herein.

Print points can be assigned to the geometry data, which points are arranged in a Cartesian matrix that has rows and columns in which multiple print dots are offset from one another, in each instance.

Preferably, print dots are assigned to the geometry data, which points are arranged in a polar matrix that has rows that run radially relative to the axis of rotation, in which rows multiple print dots are offset from one another, in each instance. In this way, a printed image having good quality is made possible. The rows with the print dots are preferably offset from one another, in the circumferential direction of the axis of rotation, by an angle that corresponds to the angle that a first radial line and a second radial line enclose between them.

The geometry data are preferably stored as a bitmap and can have an activation value for each print dot. In the simplest case, the activation value can have two states, for example the logical value "1" if the solid-body layer is supposed to be present at the print dot, and the logical value "0" if the solid-body layer is not supposed to be present at the print dot. If different material amounts or radiation energy amounts are supposed to be dispensed onto the support for the individual print dots, the activation value can also comprise more than two states. If necessary, the geometry data can also have coordinates for positions of the print dots. It is also conceivable that coordinates are provided only for those print dots at which the solid-body layer is supposed to be present. In this case, an additional activation value can be eliminated.

In an advantageous manner, in the case of the method according to the invention, the distortions that occur due to the deviation of the polar coordinate system used for printing from the Cartesian coordinate system in which the emitters of the emitter array are arranged, are distributed relatively uniform among the emitters. As a result, the maximum position deviations that occur during printing, between the material dispensing location at which the material that passes through the nozzle is applied to the support or to a solidified material layer situated on it, or, respectively, the irradiation location and the related print dot position for which geometry data are stored in the memory, are less than in the case of a corresponding method in which the radius of the reference circle line lies outside of the range. Therefore, in the case of the method according to the invention, an acceptable printed image is achieved in spite of the use of a cost-advantageous print head having emitters arranged in a Cartesian manner.

In a preferred embodiment of the invention, the radius of the reference circle line is less than the sum of 80% of the first radial distance and 20% of the second radial distance, and the radius of the reference circle line is greater than the sum of 20% of the first radial distance and 80% of the second radial distance. In this way, the maximum distortions or position deviations between the locations at which the material is applied to the support or to a solidified material layer situated on it and the geometry data can be further reduced.

A further reduction of the distortions that maximally occur due to the different coordinate systems (oblique-angled and polar, respectively) is achieved, in an advantageous embodiment of the invention, in that the radius of the reference circle line is less than the sum of 70% of the first radial distance and 30% of the second radial distance, and that the radius of the reference circle line is greater than the sum of 30% of the first radial distance and 70% of the second radial distance.

In a further development of the invention, it is provided that the radius of the reference circle line is less than the sum of 60% of the first radial distance and 40% of the second radial distance, and that the radius of the reference circle line is greater than the sum of 40% of the diameter of the outer circular path and 60% of the diameter of the inner circular path. In particular, it is advantageous if the radius of the reference circle line is less than the sum of 55% of the first radial distance and 45% of the second radial distance, and if the radius of the reference circle line is greater than the sum of 45% of the diameter of the outer circular path and 55% of the diameter of the inner circular path. In this way, the maximal distortions during printing can be further reduced.

In an advantageous embodiment of the invention, an emitter column is assigned to each trigger point, in each instance, wherein the activation signals provided for the individual trigger points are generated, in each instance, only for the emitters of the emitter column assigned to the trigger point in question, as a function of the geometry data stored in the memory and as a function of the position in which the emitter in question is arranged, and wherein the activation signals for the emitters not arranged in this emitter column are set in such a manner that these emitters are not activated if the emitter array is positioned at the trigger point relative to the support. In other words, at each trigger point the geometry data are only taken into consideration for a single emitter column, in each instance, for generating the material-dispensing signals, while the activation signals of the remaining emitter column (if the emitter array has two emitter columns) or the remaining emitter columns (if the emitter array has more than two emitter columns) are deactivated. The method can then be carried out in a simple manner, since the geometry data can be taken over directly from the memory into a print buffer for the activation signals of the (active) emitter column assigned to the trigger point, if the distance between the center points of the emitters situated within this emitter column agrees with the corresponding distance between the print dots. The active emitter column, in each instance, is cyclically changed from trigger point to trigger point. Thus, for example, in the case of an emitter array having four emitter columns, the first emitter column can be activated at a first trigger point, the second emitter column can be activated at a second trigger point, the third emitter column can be activated at a third trigger point, the fourth emitter column can be activated at a fourth trigger point, the first emitter column can be activated at a fifth trigger point, the second emitter column can be activated at a sixth trigger point, etc. The method according to claim 7 is particularly suitable for emitter arrays in which the distance between the first and the last emitter column and thereby the width of the emitter array is small as compared with the diameter of the reference circle line.

For practical purposes, the emitter columns of the emitter array are arranged symmetrically relative to a radial plane that passes through the axis of rotation and a normal line to the axis of rotation, in such a manner that the emitter columns run parallel to this radial plane. If the emitter array has an odd number of emitter columns, the arrangement of the emitter columns is preferably such that the center emitter column or its straight extension runs through the axis of rotation. If the print head array has an even number of emitter columns, the axis of rotation is preferably arranged centered between the two innermost emitter columns or their straight extensions.

In a further development of the invention, at least a first and a second emitter array are provided for printing of print rings arranged concentrically to the axis of rotation, each delimited by an inner and an outer circular path, wherein these emitter arrays are positioned relative to the axis of rotation in such a manner that the arithmetical average value of the inner and the outer circular path of the first emitter array differs from the arithmetical average value of the inner and the outer circular path of the second emitter array, wherein for generating the trigger signal of the first emitter array, a reference circle line having a first radius is used, and for generating the trigger signal of the second emitter array, a reference circle line having a second radius that deviates from the first radius is used, and wherein the first radius is selected in accordance with one of claims 1 to 5, as a function of the first and second radial distance of the first emitter array, and the second radius is selected as described herein, as a function of the first and second radial distance of the second emitter array. In an advantageous manner, in this regard the reference circle line of each emitter array is arranged, in each instance, within the print ring assigned to the emitter array, at a distance from its inner and outer edge. Here the distortions that maximally occur during printing can be further reduced. Preferably print rings arranged adjacent to one another border on one another or overlap slightly, in such a manner that in the radial direction, gap-free imprinting of the support or of a solidified material layer situated on it is possible.

In a preferred embodiment of the invention, at least two emitter arrays are provided, which are offset relative to one another with reference to the axis of rotation by a rotational angle, wherein the emitters of the individual emitter arrays are controlled, in each instance, for application of material portions, as described herein. This allows faster material application and/or greater print resolution.

In an advantageous embodiment of the invention, the center points of emitters that are adjacent to one another within the emitter columns are arranged at a constant first raster distance relative to one another, wherein emitter columns that are adjacent to one another are offset from one another, in each instance, at a constant second raster distance, and wherein the first raster distance deviates from the second raster distance by less than 20 percent, in particular by less than 10 percent, and, in particular, agrees with it. In this way, the distortions during printing can be further reduced.

Using the method according to the invention, it is possible to produce three-dimensional shaped objects. For this purpose, in the case of the method in which the material is applied using nozzles, a plurality of solid-body layers of the material that passes through the nozzles are applied, one on top of the other. After each application of a material layer, this layer is solidified, in each instance, before a further material layer is applied. If the material is a cross-linkable polymer material, solidification of the material can be achieved, for example, in that it is irradiated with UV light having a suitable wavelength. The distance between the emitter array and the support is increased, from one layer to the next layer, in each instance, by the thickness of the material layer last applied. In the case of the method as described herein, multiple material layers of the liquid, paste-like or powder-form material are solidified over their full area and/or in certain regions, one on top of the other, so as to produce a three-dimensional shaped object, by means of irradiation with the emitter array.

BRIEF DESCRIPTION OF THE DRAWINGS

In the following, exemplary embodiments of the invention are explained in greater detail using the drawing. This shows.

DESCRIPTION OF THE INVENTION

Figure 1:
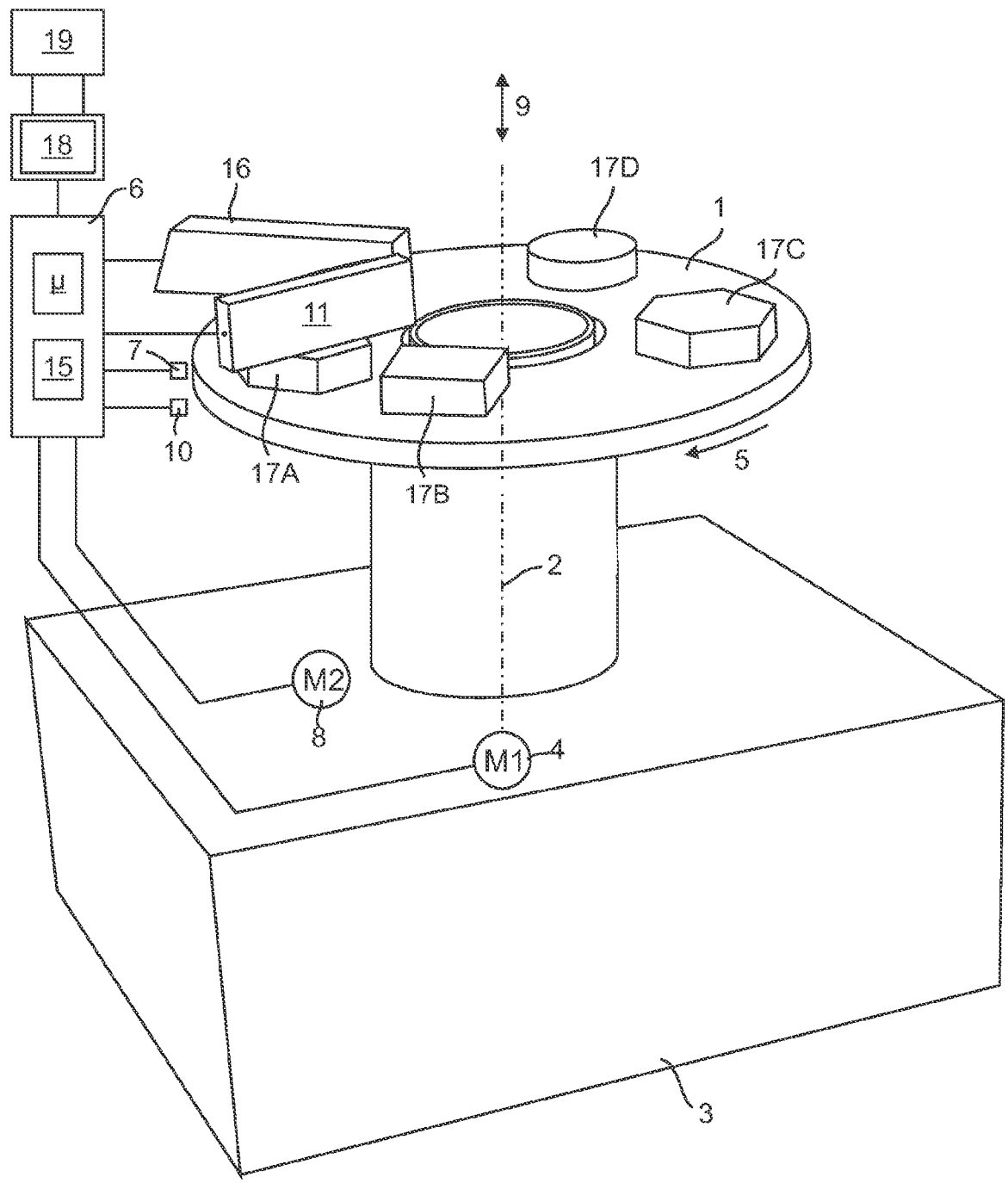
FIG. 1 an apparatus for producing three-dimensional shaped objects by means of layer-by-layer material application, which apparatus has a support structured as a rotary disk onto which a number of material layers for the shaped objects are applied, FIG. 2 a representation similar to FIG. 1, after further material layers have been applied and the support was lowered as compared with FIG. 1, FIG. 3 a partial top view of the support and an emitter array arranged above it, with emitters (nozzles) arranged in a Cartesian manner, in multiple columns, for dispensing material portions of a material that passes through the nozzles onto the support, wherein the location of the emitters is marked schematically by means of circles, FIG. 4 a graphic representation of a Cartesian print dot matrix, FIG. 5 activation data for a first trigger point, FIG. 6 a representation similar to FIG. 3, wherein the support is situated at the first trigger point, at which a first emitter column dispenses material portions onto the support so as to produce an interrupted line, wherein the material portions are cross-hatched, FIG. 7 activation data for a second trigger point, FIG. 8 a representation similar to FIG. 3, wherein the support is situated at the second trigger point, at which a second emitter column dispenses further material portions onto the support so as to produce the interrupted line, FIG. 9 activation data for a third trigger point, FIG. 10 a representation similar to FIG. 3, wherein the support is situated at the third trigger point, at which a third emitter column dispenses material portions onto the support, FIG. 11A material portions that have been applied to the support in accordance with the exemplary embodiment of the invention shown in FIGS. 5 to 10, along an interrupted line, wherein the material portions are marked by full-area circles, and locations at which no material was applied in the region of an interruption are marked by means of dashed circles, FIG. 11B a representation similar to FIG. 11A, wherein, however, the material portions were not applied to the support in accordance with the invention, FIG. 12 a partial top view of the support and the emitter array arranged on it, wherein trigger points at which the emitter columns have dispensed material onto the support during printing of the line shown in FIG. 10B, which line was not produced in accordance with the invention, are marked by arrows at the upper edge of the drawing, FIG. 13 and 14 a partial top view of the support of an apparatus for layer-by-layer production of a three-dimensional shaped object, wherein the support has multiple emitter arrays, which are assigned to different print rings, FIG. 15 and 16 views of the emitters of different print heads, FIG. 17 an apparatus for producing three-dimensional shaped objects in accordance with the stereolithography model, wherein the apparatus has a container in which a support that can rotate and a material that can be solidified by means of irradiation with electromagnetic radiation are arranged, FIG. 18 a longitudinal section through the axis of rotation of the apparatus shown in FIG. 17, and FIG. 19 a representation similar to FIG. 18, after further material layers have been solidified and the container was lowered as compared with FIG. 18.

In the case of a method for layer-by-layer application of material that passes through a nozzle, onto a support 1 arranged in the horizontal plane, a rotary disk in the shape of a circular ring, which has the support 1, is provided, which disk is mounted so that it can be rotated about a vertical axis of rotation 2, on a holder 3 that is fixed in place. The holder 3 has a standing surface on its underside, by means of which it can be set up on a tabletop or on the floor of a room, for example.

The support 1 stands in a drive connection with a first positioning device that has a first drive motor 4, by means of which the support 1 can be driven to rotate in the direction of the arrow 5 and can be positioned in accordance with a rotational position reference value signal that is provided by a control device 6. For this purpose, the first drive motor 5 is connected with a first position regulator integrated into the control device 6, which regulator has an encoder 7 for detecting a rotational position signal for the support 1. Using the first positioning device, it is possible to rotate the support 1 about the axis of rotation 2 continuously and without stopping, over almost any desired angles of more than 360° relative to the holder 3.

Figure 2:
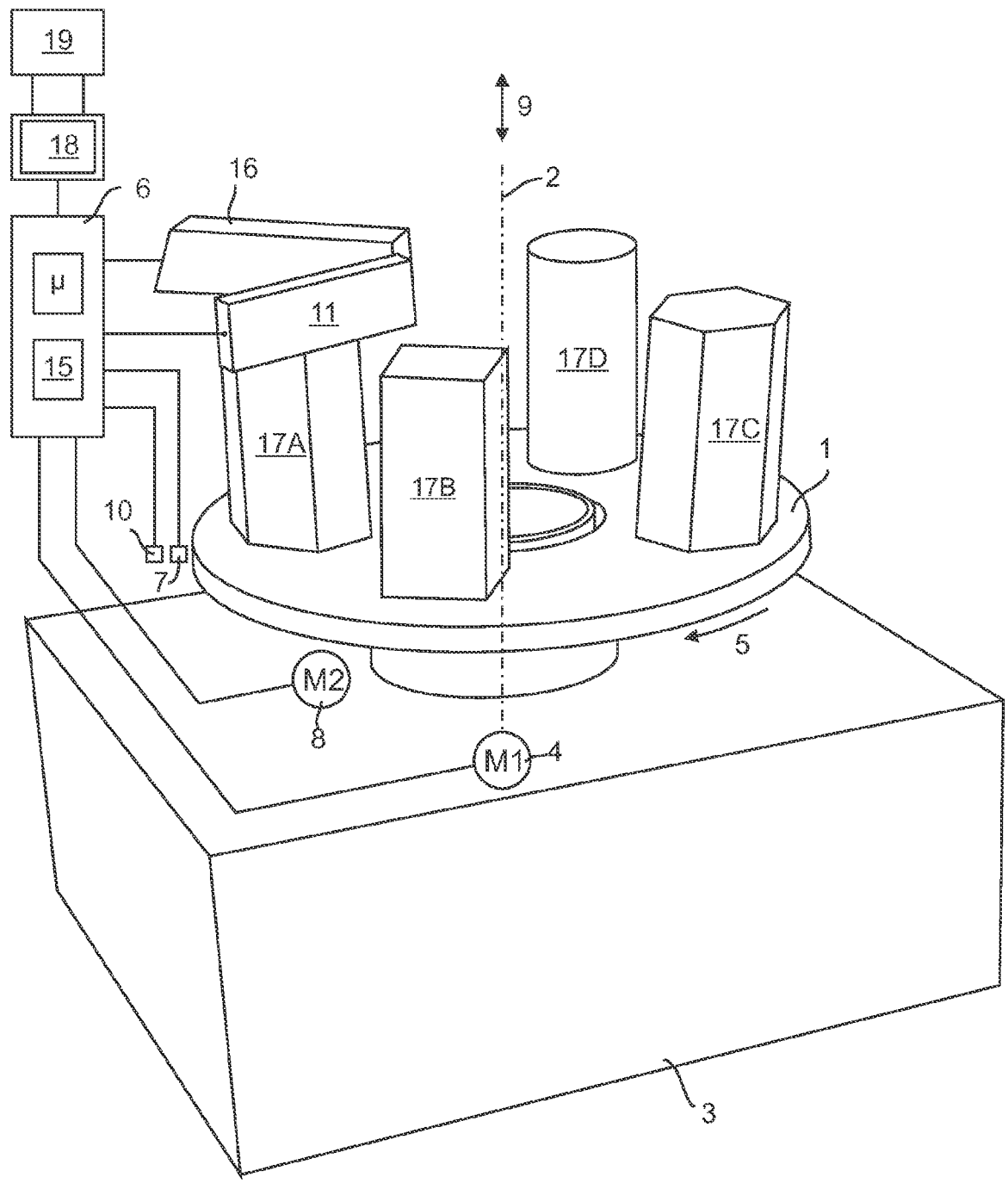

The support 1 furthermore stands in a drive connection with a second positioning device that has a second drive motor 8, by means of which the support 1 can be displaced up and down relative to the holder 3, in the direction of the double arrow 9, and can be positioned in accordance with a height position reference value signal provided by the control device 6 (FIGS. 1 and 2). This positioning can take place step by step or continuously. For this purpose, the second drive motor 10 is connected with a second position regulator that is integrated into the control device 6, which regulator has a position sensor 10 for detecting the height position of the support 1.

To carry out the method, an emitter array 11 is furthermore provided, which is structured as a commercially available print head that has a plurality of emitters 12 provided with controllable valves or pumps and structured as nozzles, from which material portions (for example droplets) of a curable material that can pass through the nozzles can be dispensed. In place of a commercially available print head, a different emitter matrix having fixed emitters can also be used. The material can be, for example, a polymer that can be cross-linked with light and/or electromagnetically and/or chemically, which is kept on hand in a reservoir not shown in any detail in the drawing, which reservoir is connected with the emitters 12 by way of lines.

The emitters 12 are arranged above the support 1, in a plane that runs parallel to the plane of the support 1 and is arranged at a distance from it, and positioned relative to one another in a Cartesian manner, in multiple emitter columns 13A, 13B, 13C that are arranged parallel to one another, and emitter rows that run transverse to them. In the emitter columns 13A, 13B, 13C, the center points of the individual emitters 12 or the centroids of their nozzle openings are offset relative to one another at constant intervals along straight lines 14A, 14B, 14C.

The emitter array 11 is connected with a print buffer 15 in which an activation signal can be temporarily stored for each emitter of the emitter array 11, in each instance. The activation signal can have the logical value "1" or the logical value "0", for example.

Furthermore, the emitter array 11 has a trigger input to which a trigger signal can be applied. For every trigger that is received at the trigger input, all the emitters 12 of the emitter array 11 for which the value "1" is stored in the printer buffer 15, in each instance, dispense a material portion. Emitters 12 for which the value "0" is stored in the printer buffer are not activated when a trigger is received, i.e. these emitters 12 do not dispense a material portion.

A UV light source 16 is provided for solidification or for cross-linking of a material layer applied to the support 1, to a material layer situated on it and/or to a layer stack situated on the support 1, having multiple material layers applied by means of the emitter array 11, which source is positioned at the support 1 in such a manner that it faces the support 1 with its emission side.

In the exemplary embodiment according to FIGS. 3, 6, 8, and 10, the emitter array 11 has three emitter columns 13A, 13B, 13C, which are arranged at constant intervals relative to one another and run parallel to one another. The straight extension of the line 14B that connects the center points of the emitters 12 of the center emitter column 13B with one another runs through the axis of rotation 2. The straight extensions of the two lines 14A, 14C that connect the two other emitter columns 13A, 13C with one another are at a distance from the axis of rotation 2 by the dimension by which the lines 14A, 14B and 14B, 14C, respectively, are offset relative to one another at a right angle to their expanse direction.

Figure 3:
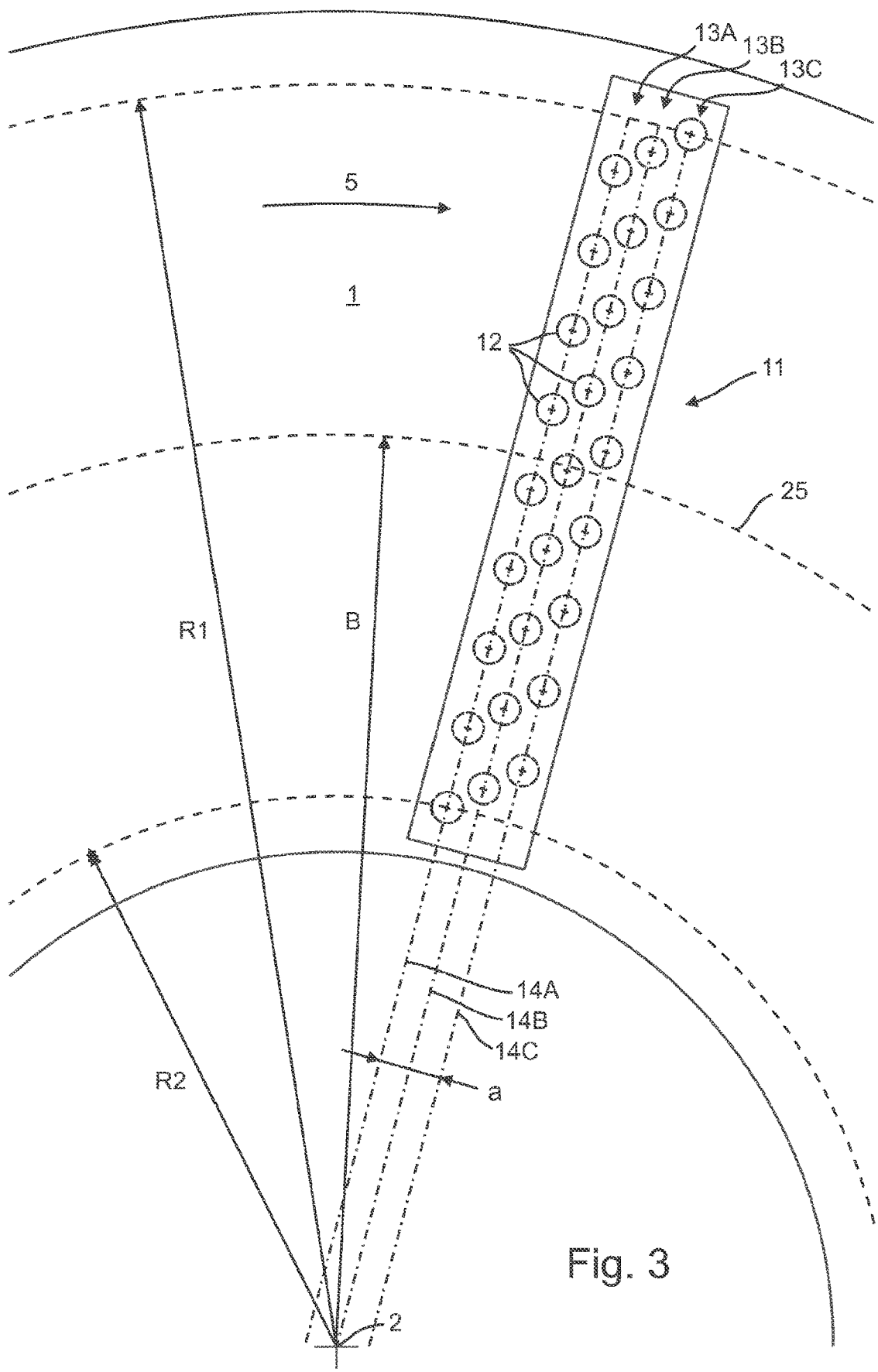

In FIG. 3, the emitter array 11 is shown magnified. The distance a between the line 14A that connects the center points of the emitters 12 of the first emitter columns 13A with one another, and the line 14A that connects the center points of the emitters 12 of the last emitter column 13C with one another can be approximately between 20 μm and 100 μm.

Using the apparatus that has the support 1, the emitter array 2, the control device 6, and the UV light source 16, it is possible to produce three-dimensional shaped objects 17A, 17B, 17C, 17D on the support 1 by means of layer-by-layer application and solidification of a plurality of material layers of the material that passes through the nozzles.

The control device 6 is connected with an overriding computer 18, such as, for example, a PC, which has a memory 19 in which geometry data are stored as print dots for the individual material layers, in accordance with which the material layers of the shaped objects 17A, 17B, 17C, 17D are produced. The print dots are arranged in a polar matrix that has rows that run radially relative to the axis of rotation, in which rows multiple print dots are offset from one another, in each instance. The print data or geometry data can be provided by means of CAD software, for example, which can run on the computer 18. Furthermore, software can be run on the computer 18, which generates the geometry data for the individual layers of the shaped objects 2A, 2B, 2C, 2D. To load print data generated using the geometry data into the print buffer 14, the computer 18 is connected with the control device 6.

As can be seen in FIG. 3, the center point of the emitter 12 of the emitter array 11, which emitter is farthest away from the axis of rotation 2, has a first radial distance R1 from the axis of rotation 2, and the center point of the emitter 12 arranged closest to the axis of rotation 2 has a second radial distance R2 from the axis of rotation 2. The center point of the emitter 12 farthest away from the axis of rotation 2 lies on a circular line having the radius R1 and concentric to the axis of rotation 2. The center point of the emitter 12 arranged closest to the axis of rotation 2 lies on a circular line having the radius R2 and concentric to the axis of rotation 2.

In the following, the sequence of the method will be explained using FIGS. 3 and 5 to 10. The support is rotated in the direction of the arrow 5, about the axis of rotation 2, and a trigger signal is generated, which defines trigger points for the rotational position of the emitter array 11 relative to the support 1. Trigger points that are adjacent to one another in the circumferential direction are offset relative to one another by a constant angle α about the axis of rotation 2. The angle α corresponds to the angle that a first radial line 23 and a second radial line 24 enclose between them. The first radial line 23 runs from the axis of rotation 2 to the intersection point of the line 14A, on which the center points of the emitters 12 of a first emitter column 13A lie, and a reference circle line 25 concentric to the axis of rotation 2, the radius B of which line corresponds to the arithmetical average value of the first radial distance R1 and the second radial distance R2. The second radial line 24 runs from the axis of rotation 2 to the intersection point of the line 14B, on which the center points of the emitters 12 of a second emitter column 13B lie, and the reference circle line 25. A first trigger point is marked in FIG. 6 with the arrow 20, a second trigger point is marked in FIG. 8 with the arrow 21, and a third trigger point is marked in FIG. 10 with the arrow 22.

Print data or geometry data for a straight material line to be printed are stored in the memory 19, which line has an interruption approximately in the center in the longitudinal direction. Print dots are assigned to the print data or geometry data, which dots are shown graphically in FIG. 4. It can be clearly seen that the print dots are arranged in a Cartesian matrix that has rows 33 offset parallel to one another, in which multiple print dots, in each instance, are offset from one another at constant distances. Print dots at which the solid-body layer is supposed to be present are shown as full-area circles in FIG. 4, and print dots at which the solid-body layer is not supposed to be present are shown as circular lines. Before the print dots are printed, the geometry data are first transformed into a polar matrix, in which the print dots are offset relative to one another in rows that run radially relative to the axis of rotation 2. Rows of the polar matrix that are adjacent to one another are offset from one another, in each instance, by the angle distance of the trigger points 21, 22, 23.

Figures 5, 7, 9:
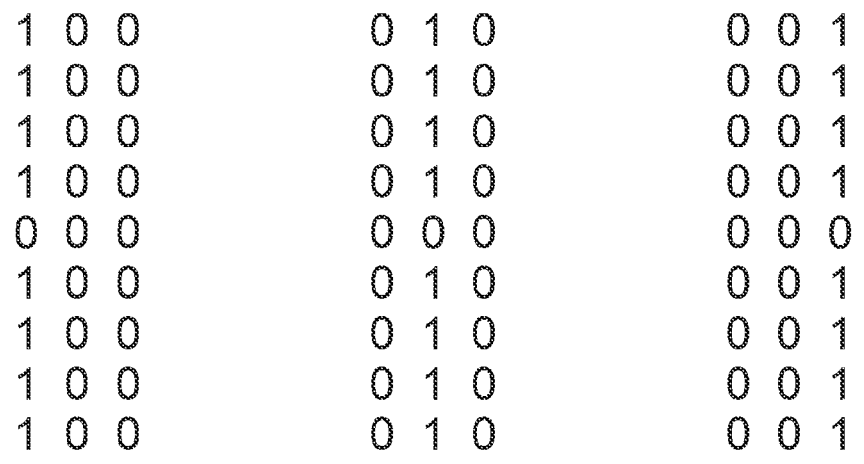

Before the support 1 reaches the first trigger point, a first activation signal is placed in the print buffer 15 for each emitter 12 of the emitter array 11, in each instance. For the individual emitters 12 of the first emitter column 13A of the emitter array 11, the first activation signal is determined using the control device 6 and temporarily stored in the print buffer 15, in each instance, as a function of the geometry data stored in the memory 19 and as a function of the position in which the emitter 12 in question is arranged relative to the support 1 when the support 1 is positioned at the first trigger point. If the emitter 12 in question is supposed to dispense material onto the support 1, the logical value "1" is placed in the print buffer for the emitter 12, otherwise it is the value "0". The activation signals of the emitters 12 of the second and third emitter column 13B, 13C are set to the logical value "0". This value is placed in the print buffer 15, in each instance (FIG. 5). As soon as the support 1 is positioned at the first trigger point, marked by the arrow 20, the emitter array 11 is triggered. When the trigger is received, all the emitters 12 for which the value "1" is stored in the print buffer each dispense a material portion to the rotating support 1. The material portions are shown cross-hatched in FIG. 6. Emitters for which the value "0" is stored in the print buffer do not dispense any material.

Before the support 1 reaches the second trigger point, marked by the arrow 21 (FIG. 8), in a further step a second activation signal is placed in the print buffer 15. For the individual emitters 12 of a second emitter column 13B, the second activation signal is determined using the control device 6 and temporarily stored in the print buffer 15, in each instance, as a function of the geometry data stored in the memory 19 and as a function of the position in which the emitter 12 in question is arranged relative to the support 1 when the support 1 is positioned at the second trigger point. The activation signals of the emitters 12 of the first and third emitter column 13A, 13C are set to the logical value "0". This value is placed in the print buffer 15, in each instance (FIG. 7). As soon as the support 1 is positioned at the second trigger point, the emitter array 11 is triggered, i.e. all the emitters 12 for which the value "1" is stored in the print buffer are fired.

Before the support 1 reaches the third trigger point, marked by the arrow 22 (FIG. 10), in a further step a third activation signal is placed in the print buffer 15. For the individual emitters 12 of the third emitter column 13C, the third activation signal is determined using the control device 6 and temporarily stored in the print buffer 15, in each instance, as a function of the geometry data stored in the memory 19 and as a function of the position in which the emitter 12 is question is arranged relative to the support 1 when the support 1 is positioned at the third trigger point. The activation signals of the emitters 12 of the first and second emitter column 13A, 13B are set to the logical value "0". This value is placed in the print buffer 15, in each instance (FIG. 9). As soon as the support 1 is positioned at the third trigger point, the emitter array 11 is triggered once again, i.e., all the emitters for which the value "1" is stored in the print buffer are fired.

Figures 11A, 11B:
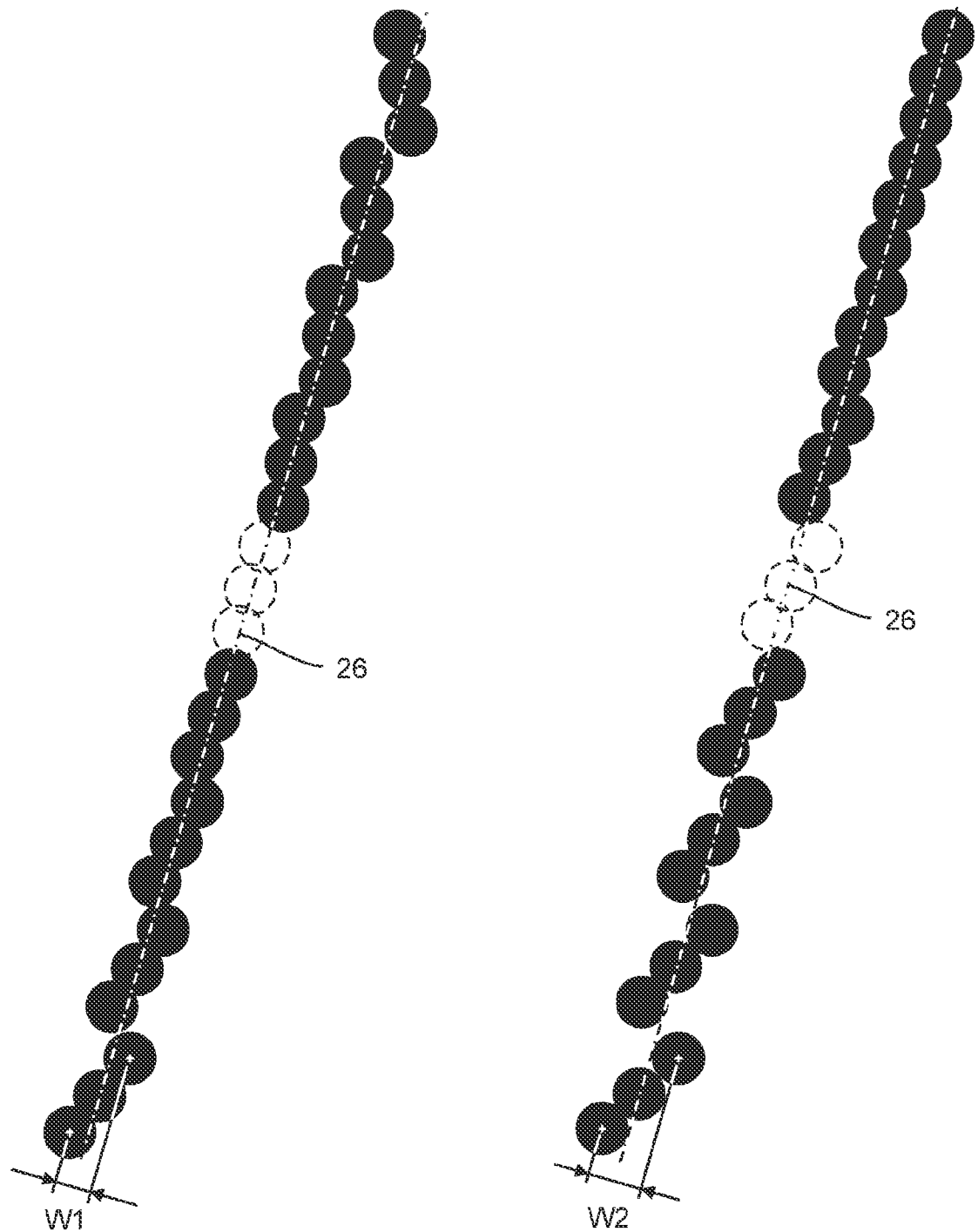
Figure 12:
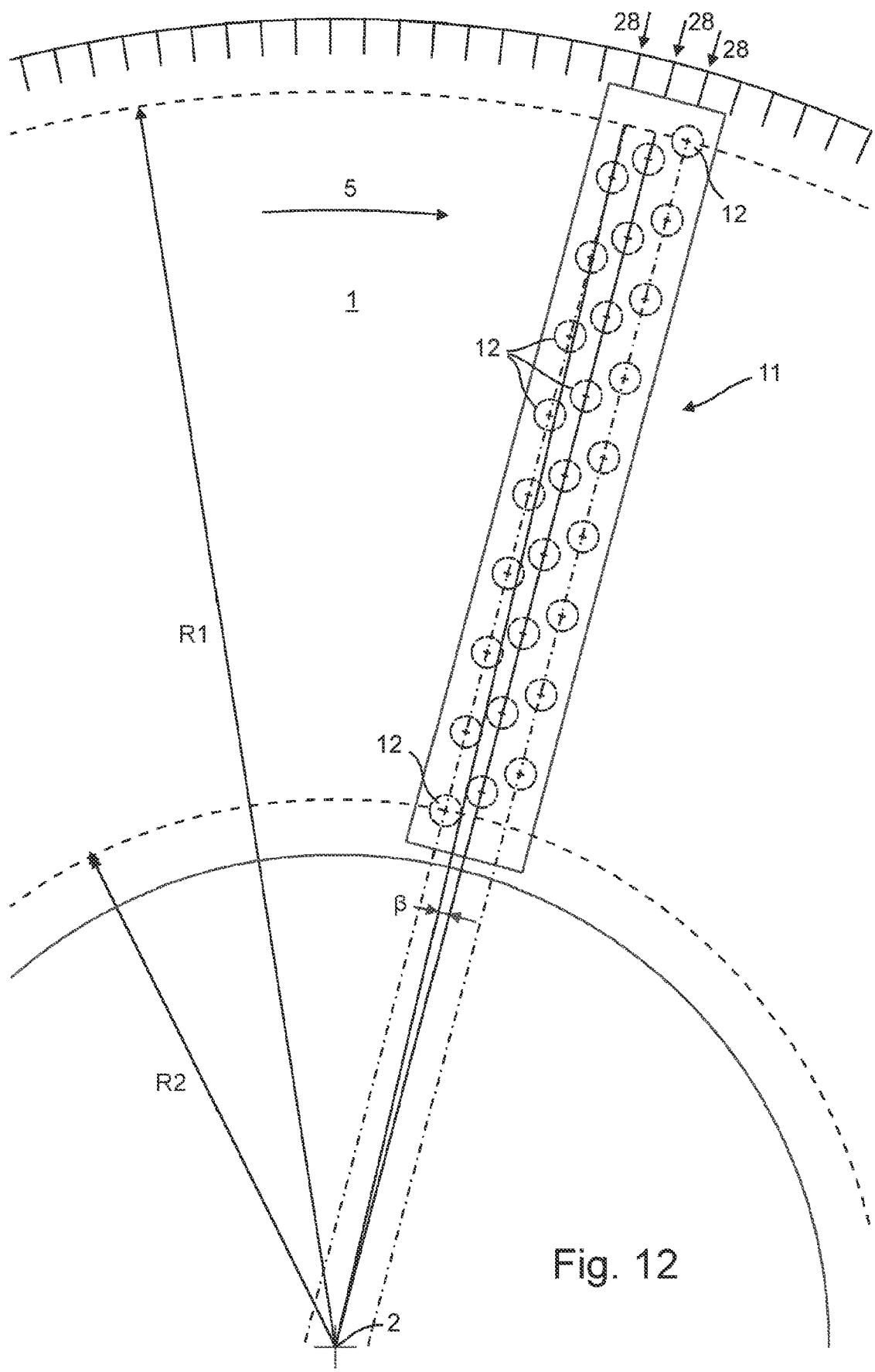

In FIG. 11A, the interrupted line generated in the case of the exemplary embodiment described above is shown. The full-area black circles mark the locations at which material portions were dispensed onto the support 1 so as to print the line. Locations at which no material was applied to the support 1, in the region of the interruption, are marked with dashed circles. The dot-dash reference line 26 marks the reference position of the center line of the interrupted line to be printed, as predetermined by the geometry data.

If geometry data for an interruption-free, solid line are stored in the memory 19, all the emitters 12 of the emitter column Assigned to the trigger point in question are fired at every trigger point, in each instance. In this case, material portions are dispensed onto the support 1 not only at the locations marked with the full-area black circles, but also at the locations marked with the dashed circles.

As can be seen in FIG. 11A, the center points of the material portions that are dispensed by the emitters 12 that lie approximately in the middle of the emitter array 11 in the expanse direction of the emitter array 11 either lie on the reference line 26 or are at only a very slight distance from it. With an increasing distance from the center, the deviations increase, in each instance, toward the outer and inner edge of the printed region. The greatest deviations occur at the outer and inner edge of the printed region.

In FIG. 11B, the printed image is shown that occurs if the interrupted line stored in the memory 12 is printed using a method not according to the invention, which differs from the method according to the invention in that the radius of the reference circle line concentric to the axis of rotation 2 corresponds to the first radial distance R1. Trigger points 28 that are adjacent to one another in the circumferential direction are offset relative to one another by a constant angle β about the axis of rotation 2, which angle is smaller than the angle α from FIG. 6. In this case, the center points of the material portions that are dispensed by the emitters 12 that lie farthest away from the axis of rotation 2 in the emitter columns 13A, 13B, 13C in question, either lie on the reference line 26 or are at only a slight distance from it. From the outer to the inner edge of the printed region, the deviations become greater. The greatest deviations occur at the inner edge of the printed region. From a comparison of FIG. 11A and FIG. 11B, it becomes clear that the maximum width w2 of the printed line in FIG. 11B is greater, due to the greater deviations, than the maximum width w1 of the printed line in accordance with the exemplary embodiment in FIG. 11A. The widths w1 and w2 refer, in each instance, to the center points of the solidified material portions dispensed onto the support 1.

A comparison of FIG. 11A and FIG. 11B shows that the deviations of the material portions dispensed onto the support 1 from the reference line 26 in FIG. 11B are distributed less uniformly along the printed line than in the case of the line printed in accordance with the method according to the invention, as in FIG. 11A. Also, the maximum values of the deviations are greater in FIG. 11B than in FIG. 11A.

Figure 13:
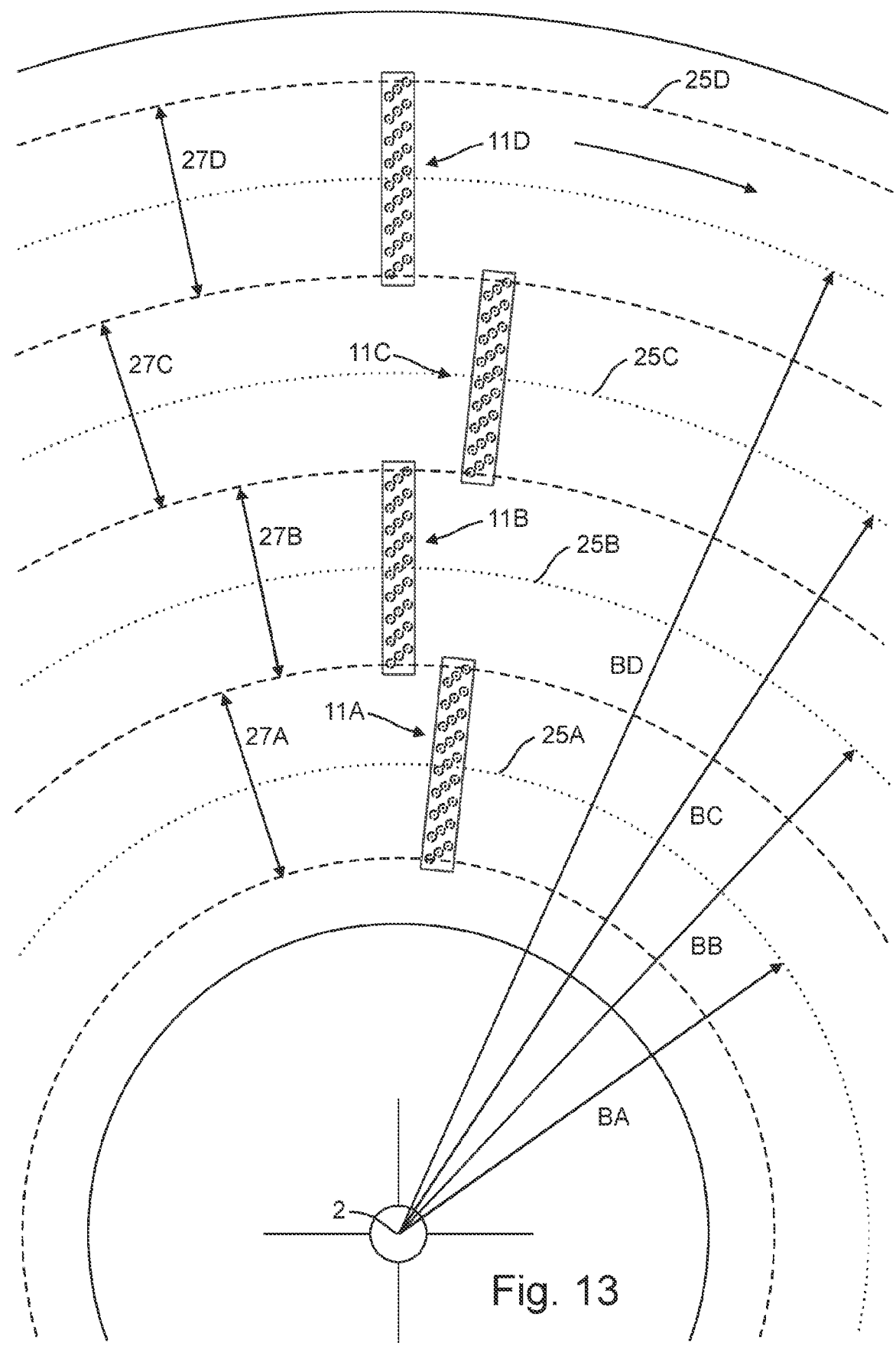

In the exemplary embodiment shown in FIG. 13, multiple emitter arrays 11A, 11B, 11C, 11D are provided for imprinting print rings 27A, 27B, 27C, 27D that are arranged concentrically relative to the axis of rotation and each delimited by an inner and an outer circular path. The emitter arrays 11A, 11B, 11C, 11D are oriented, in each instance, with their longitudinal center axis radial to the axis of rotation 2, and arranged in such a manner that the distances that the emitter arrays 11A, 11B, 11C, 11D have from the axis of rotation 2 are different. As can be seen in FIG. 13, emitter arrays 11A, 11B, 11C, 11D that are adjacent to one another in the radial direction are arranged, in each instance, in such a manner that the print rings assigned to them border on one another, so that a continuous printed region occurs in the radial direction, which region extends from the inner circular path of the print ring 27A to the outer circular path of the print ring 27D.

Each emitter array 11A, 11B, 11C, 11D has its own reference circle line 25A, 25B, 25C, 25D assigned to it, arranged concentrically relative to the axis of rotation 2, in each instance, the radius BA, BB, BC, BD of which corresponds to the arithmetical average value of the first radial distance between the center point of the emitter 12 of the emitter array 11A, 11B, 11C, 11D in question, which point is farthest away from the axis of rotation 2, and the axis of rotation 2, and the second radial distance between the center point of the emitter 12 of the emitter array 11A, 11B, 11C, 11D in question, which point is arranged closest to the axis of rotation 2, and the axis of rotation 2.

An activation signal is generated and temporarily stored for each emitter array 11A, 11B, 11C, 11D, in each instance. Furthermore, a trigger signal is generated for each emitter array 11A, 11B, 11C, 11D, in each instance, which signal defines trigger points for the rotational position between the emitter array 11A, 11B, 11C, 11D in question and the support 1.

The angle between trigger points of the individual emitter arrays 11A, 11B, 11C, 11D, which points are adjacent to one another, corresponds, in each instance, to the angle that a first radial line assigned to the emitter array 11A, 11B, 11C, 11D in question and a second radial line assigned to the emitter array 11A, 11B, 11C, 11D in question enclose between them.

The first radial line runs from the axis of rotation 2 to the intersection point between a first emitter column of the emitter array 11A, 11B, 11C, 11D in question and the reference circle line BA, BB, BC, BD assigned to the emitter array 11A, 11B, 11C, 11D. The second radial line runs from the axis of rotation 2 to the intersection point between a second emitter column of the emitter array 11A, 11B, 11C, 11D in question, which column is adjacent to the first emitter column in the circumferential direction of the axis of rotation 2, and the reference circle line BA, BB, BC, BD of the emitter array 11A, 11B, 11C, 11D.

At the trigger points assigned to the individual emitter arrays 11A, 11B, 11C, 11D, the emitters 12 of the emitter array 11A, 11B, 11C, 11D in question are controlled, in each instance, in such a manner that only those emitters 12 in which the activation signal of the emitter array 11A, 11B, 11C, 11D in question, which signal was previously temporarily stored, has been set to dispense material.

Figure 14:
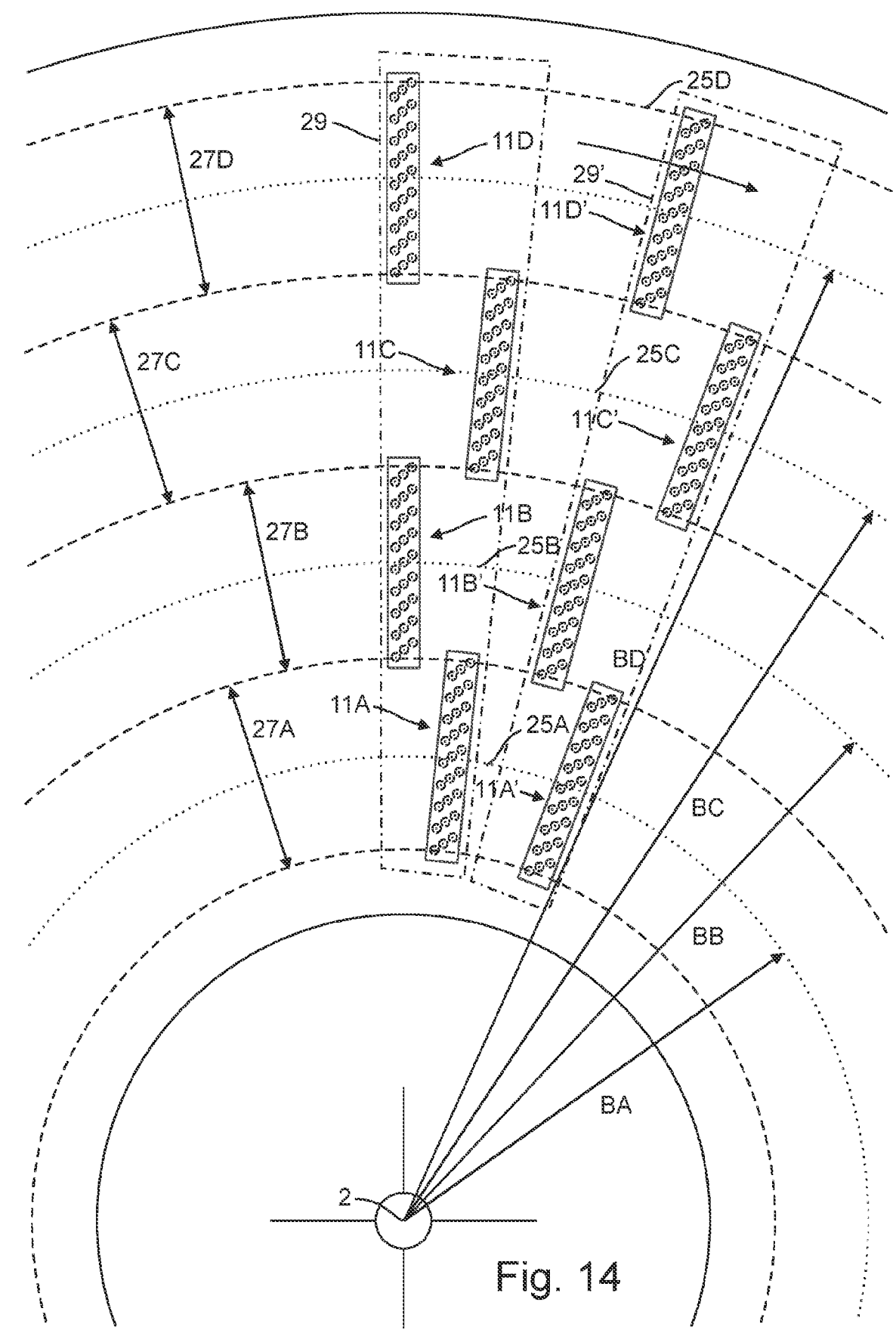

In the exemplary embodiment in FIG. 14, two emitter arrays 11A, 11A' or 11B, 11B' or 11C, 11C' or 11D, 11D', respectively, which are assigned to different print modules 29, 29', are arranged on each print ring 27A, 27B, 27C, 27D, in each instance, offset from one another in the circumferential direction. Each of these print modules works in accordance with the method described above. In a corresponding manner, if necessary more than two emitter arrays 11A, 11A' or 11B, 11B' or 11C, 11C' or 11D, 11D', respectively, can also be arranged offset from one another in the circumferential direction. Using the different print modules 29, 29', it is possible to apply different materials to the support 1. These can differ from one another, in particular, with regard to their color or with regard to their mechanical properties.

Figure 15:
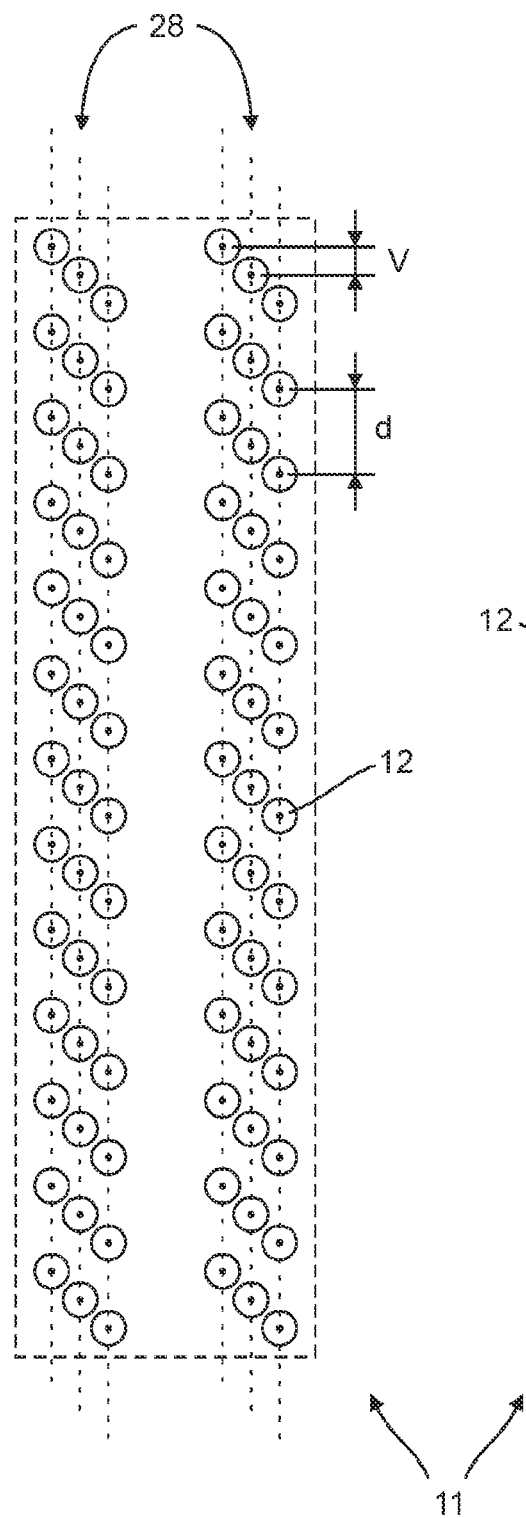

As can be seen in FIG. 15, the emitter array 11 can also have multiple groups 28 of emitter columns, in which the emitters 12 of the individual groups 28 are offset or displaced relative to one another, in each instance, in the plane in which the emitters 12 lie, at a right angle to the longitudinal expanse of the emitter columns.

Each group 28 has the same number and arrangement of emitter columns or emitters 12, respectively, in each instance. Within the groups 28, the emitter columns assigned to the group 28 in question are slightly offset from one another in the longitudinal expanse of the emitter columns, wherein the offset V is smaller than the raster distance d between the emitters 12 within the emitter columns. In this regard, the raster distance d is understood to be the distance between the center points of emitters 12 of a nozzle column that are adjacent to one another, in other words the distance between the centroids of the nozzle openings of an emitter column.

Figure 16:
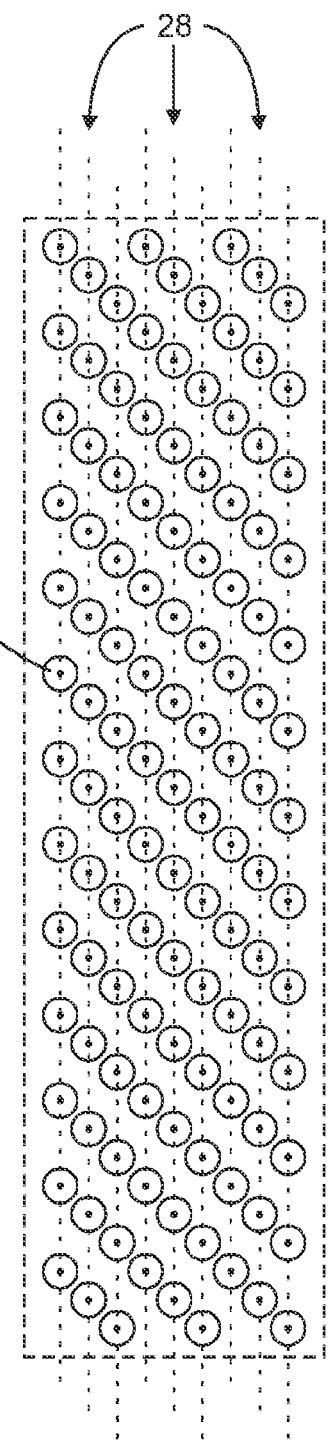

The distance between emitter columns of a group 28 that are adjacent to one another can be smaller than the distance between groups that are adjacent to one another (FIG. 15). However, the distances can also be the same (FIG. 16).

Figure 17:
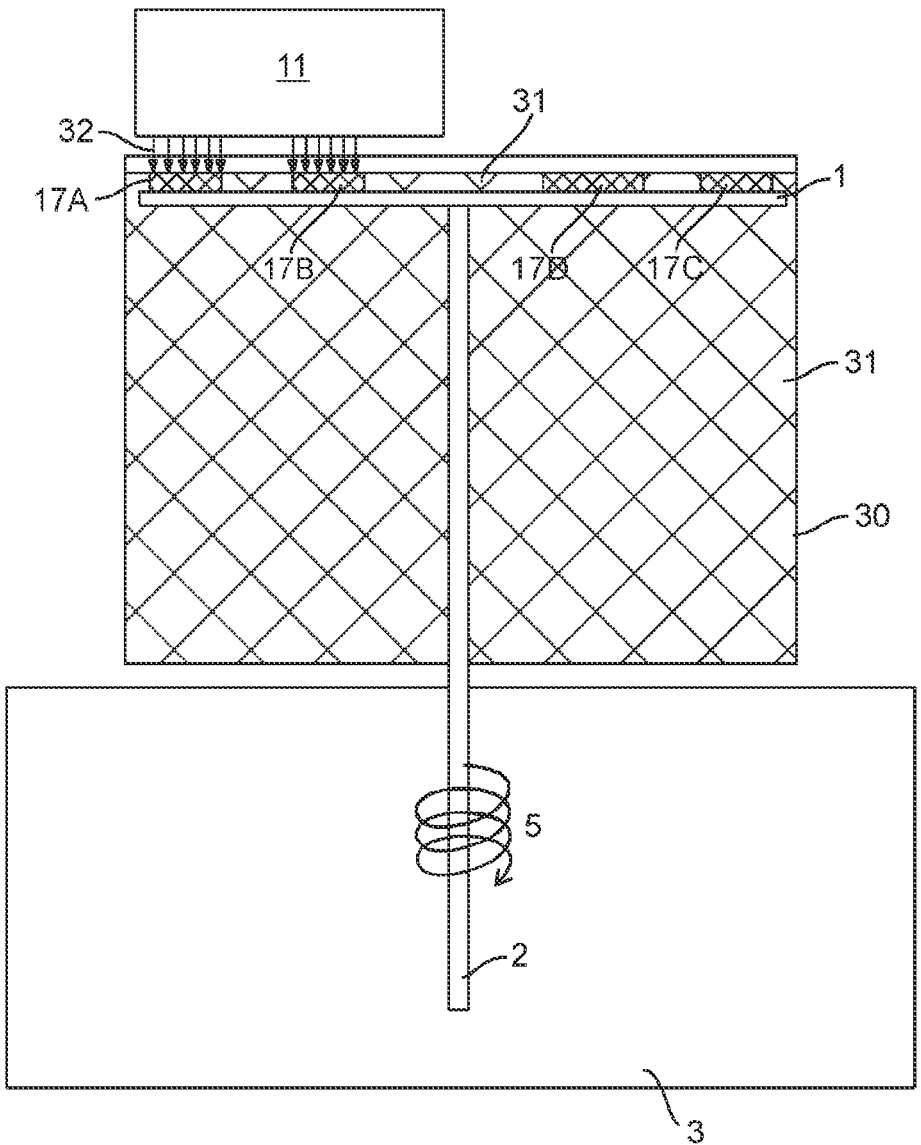
Figure 18:
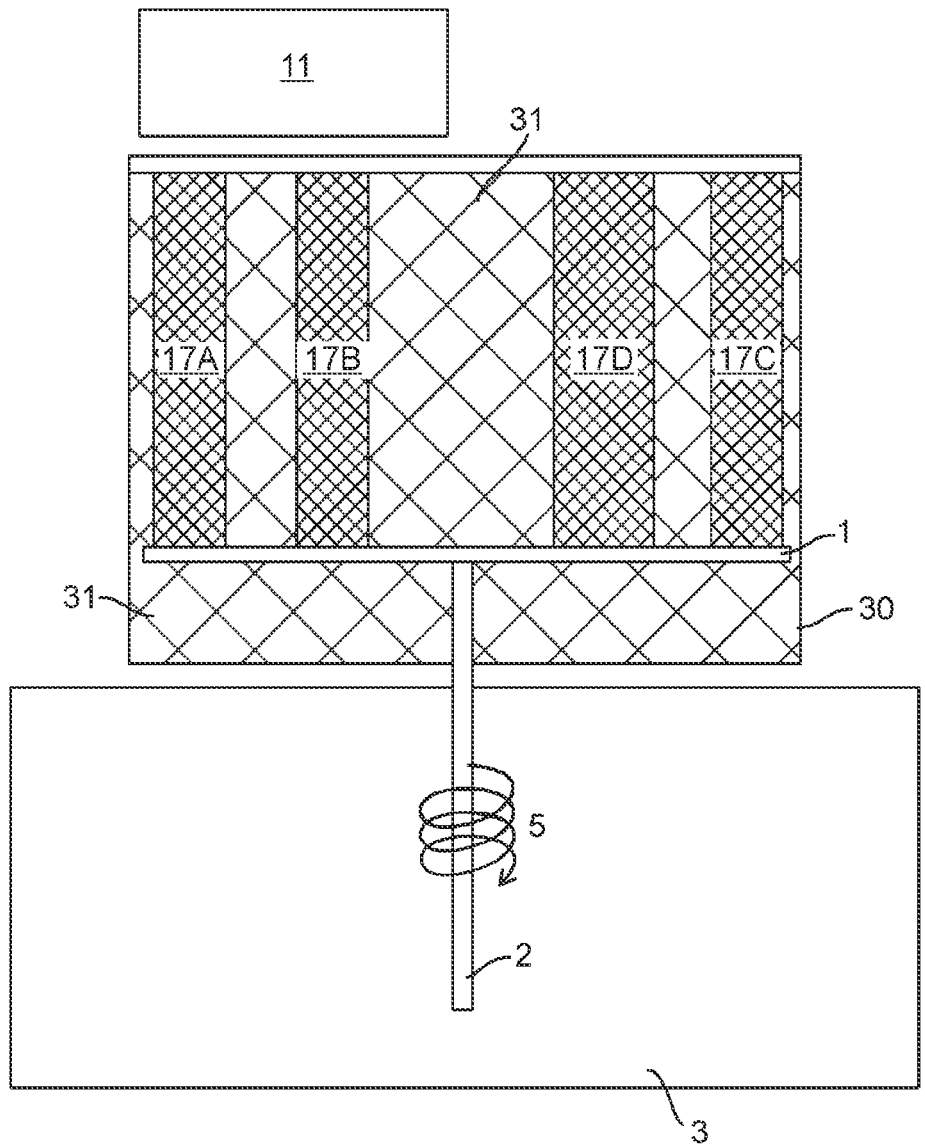
Figure 19:
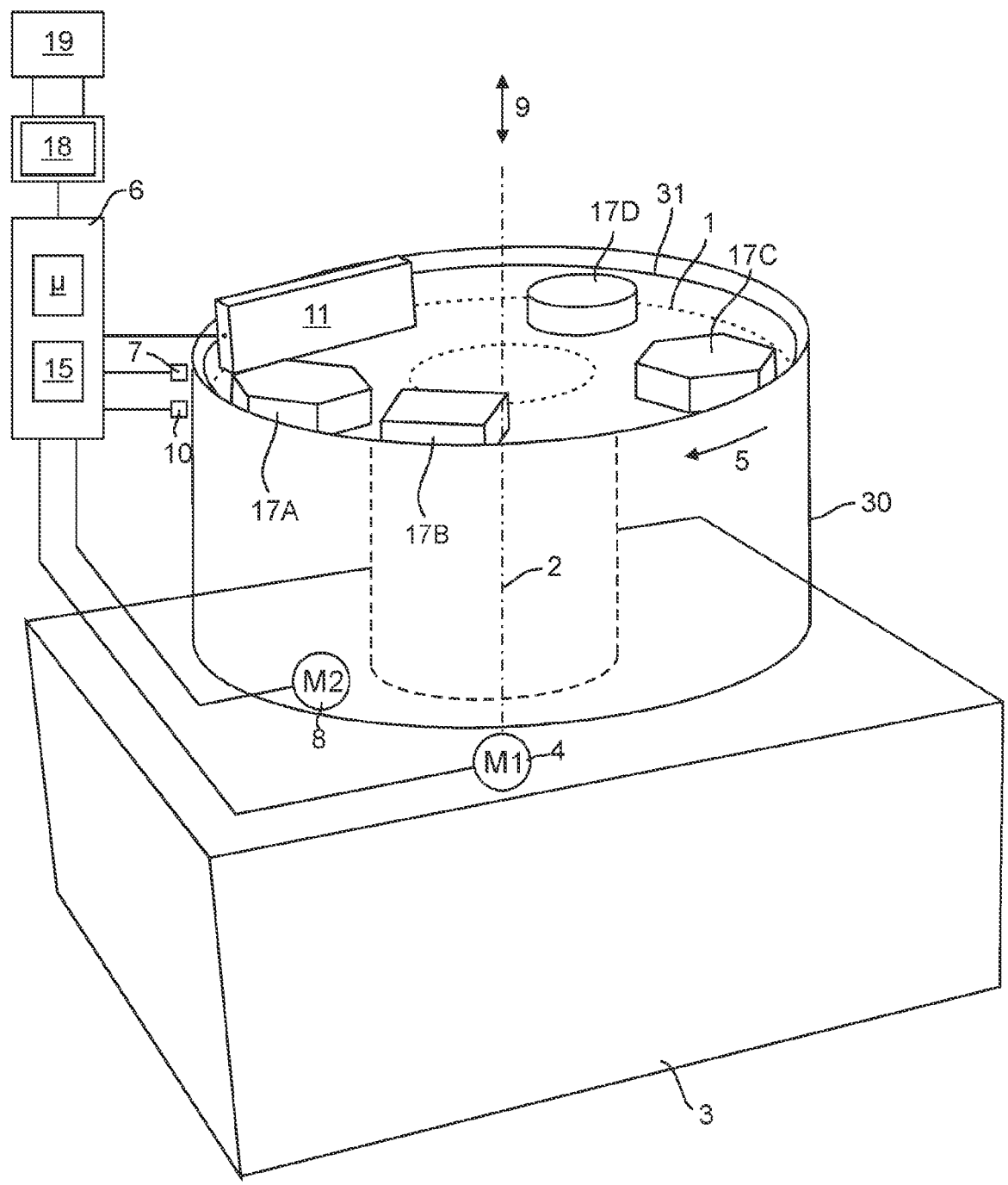

In an exemplary embodiment of the invention shown in FIGS. 17 to 19, an apparatus is provided that has a container 30, in which a liquid, paste-like or powder-form material 31 is applied to a support 1. For irradiation of the material 31 with energy-rich electromagnetic radiation 32, the emitter array 11, 11A, 11B, 11C, 11D having multiple radiation emitters 12 that are structured as light-emitting diodes, in each instance. For bundling or focusing of the radiation 32 emitted by the individual emitters 12, optics not shown in any detail in the drawing are arranged in the beam path of the emitters 12, in each instance.

The wavelength and the power of the electromagnetic radiation 32 that can be generated by means of the emitters 12 are coordinated with the material 31 capable of flow in such a manner that this material can be solidified at the irradiation point by means of irradiation with the electromagnetic radiation 32. In the case of a material 31 that is liquid or capable of flow, "to solidify" is understood to mean that the material 31 is hardened to form a solid-body material, in particular by means of cross-linking of polymers and/or copolymers contained in the material. In the case of a powder-form material 31, "to solidify" is understood to mean that material particles present as solid-body particles are heated by means of irradiation with the electromagnetic radiation 32 and subsequently cooled, in such a manner that they are firmly connected with one another.

The emitter array 11, 11A, 11B, 11C, 11D has multiple emitter columns 13A, 13B, 13C, in which the center points of the emitters 12, in each instance, are offset relative to one another in a straight line. The arrangement of the radiation emitters 12 corresponds to the arrangement of the emitters 12 in FIGS. 3, 6, 8, 10, and 12 to 16, which are structured as nozzles, so that the description of the emitter arrays 11, 11A, 11B, 11C, 11D shown in these figures applies analogously for the exemplary embodiment according to FIGS. 17 to 19, but with the difference that the emitters 12 in the exemplary embodiment according to FIGS. 17 to 19 emit radiation 32 instead of material, and that the radiation 32 is directed at the material 31 capable of flow.

The support is rotationally positioned in the container 30 relative to the emitter array 11, 11A, 11B, 11C, 11D, about an axis of rotation 2, and the radiation generated by means of the emitters 12 is directed at a material layer situated on the surface of the material 31, in such a manner that the material 31 is solidified in at least one radiation location.

Figure 4:
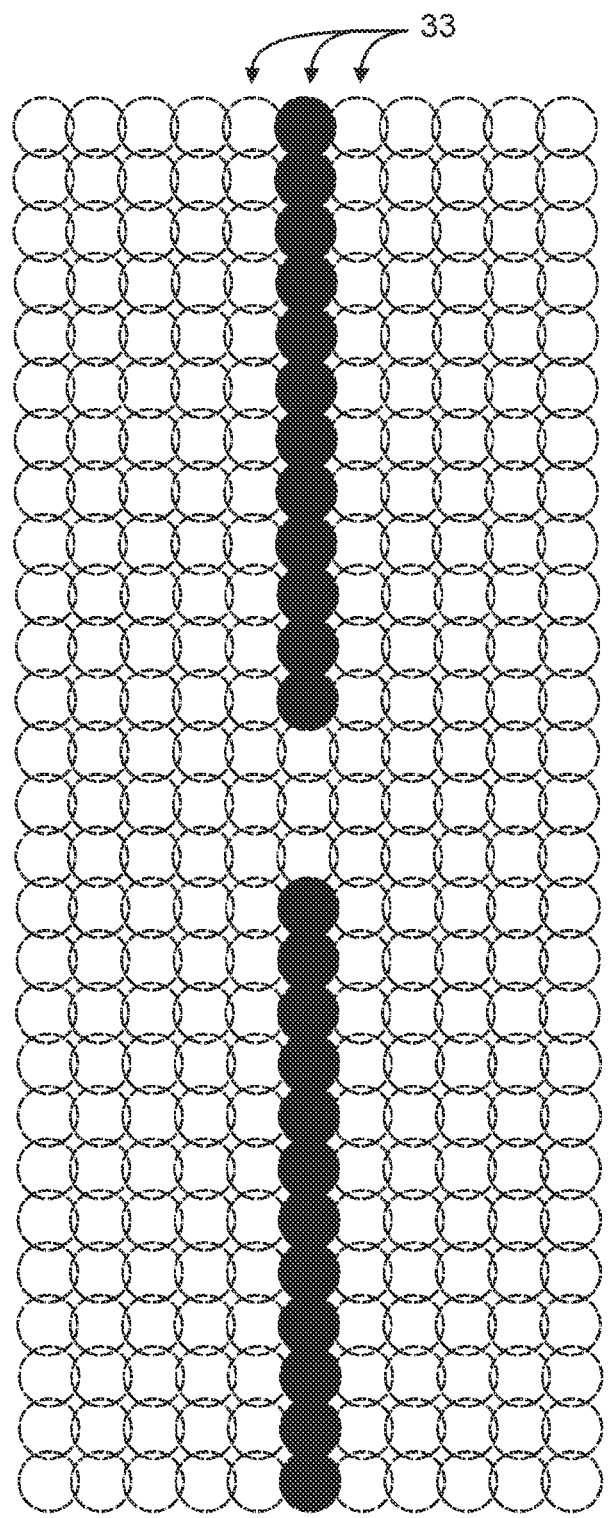
Figure 6:
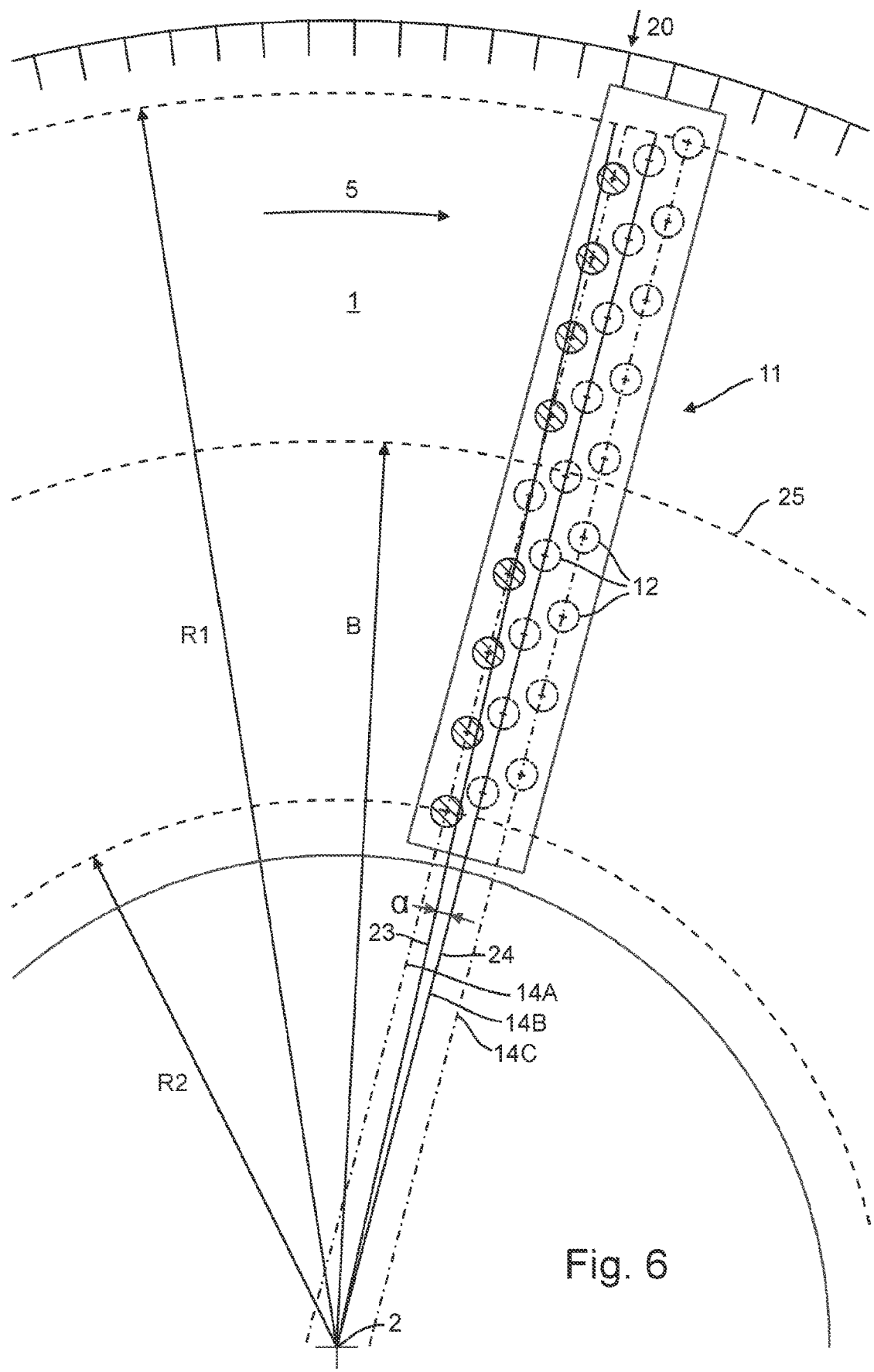
Figure 8:
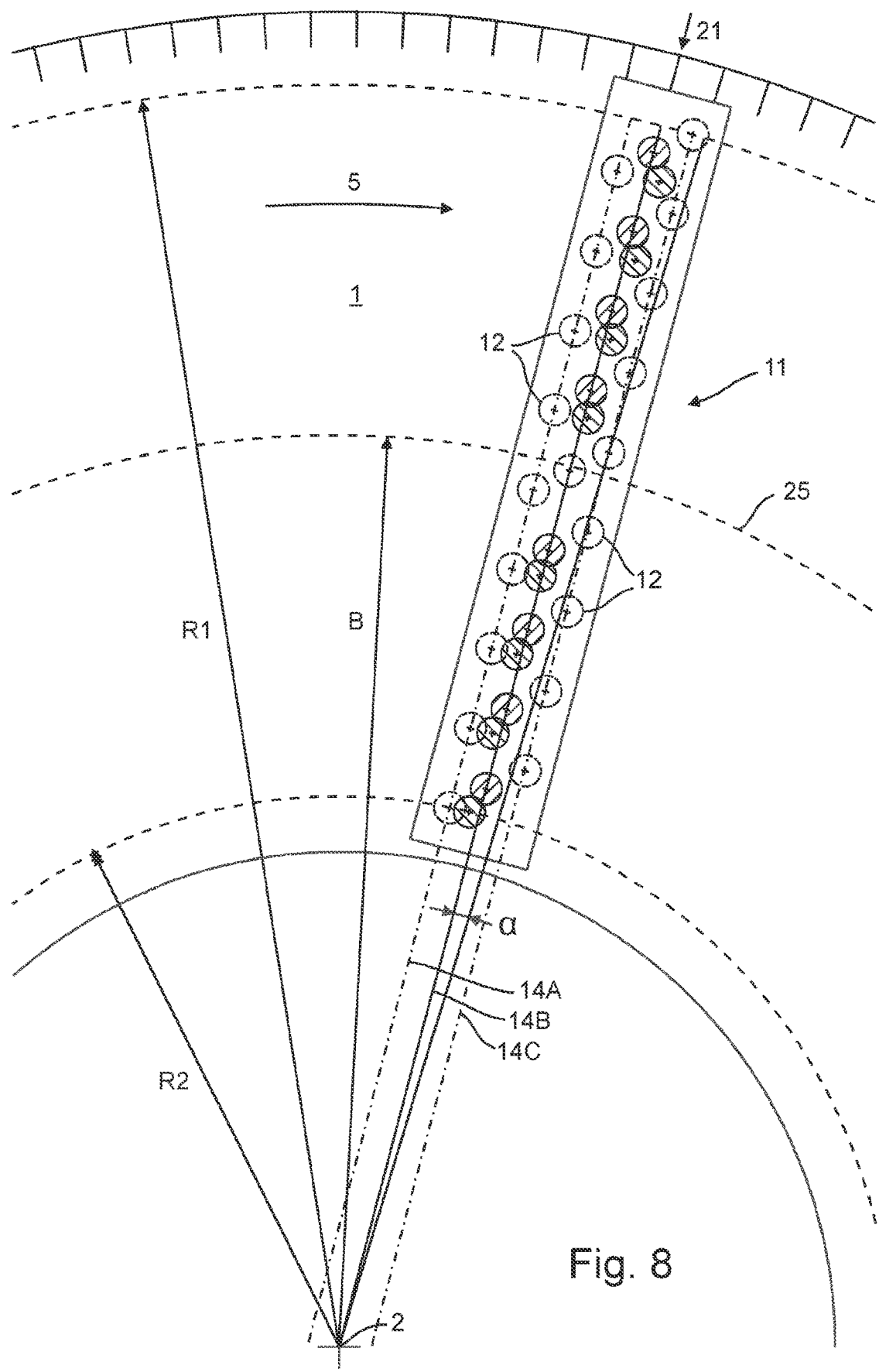
Figure 10:
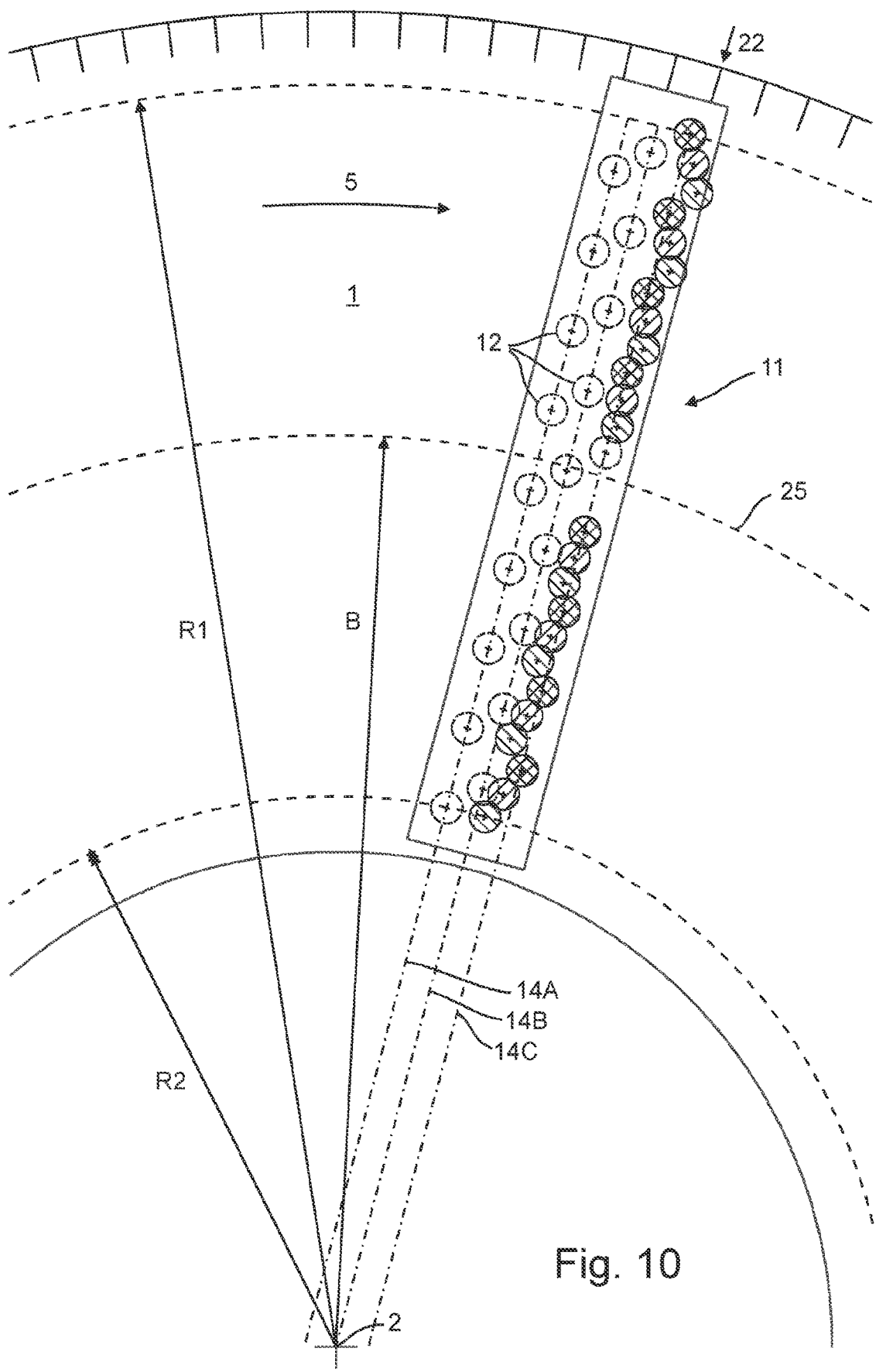

The emitter array 11 is connected with a print buffer 15, in which an activation signal for each emitter of the emitter array 11, in each instance, can be temporarily stored. A control device for controlling the radiation emitters 12 is provided, which has a trigger input. For each trigger that is received at the trigger input, all the emitters 12 of the emitter array 11, for which the value "1" is stored in the printer buffer 15, in each instance, emit radiation in the direction of the material 31. Emitters 12 for which the value "0" is stored in the printer buffer are not activated when a trigger is received, i.e. these emitters 12 do not emit any radiation. FIGS. 4, 6, and 8, which show the activation signal values for the emitter array 11 at the individual trigger points for the apparatus shown in FIGS. 1 and 2, apply analogously for the exemplary embodiment in FIGS. 17 to 19.

In the exemplary embodiment shown in FIGS. 17 to 19, the support 1 stands in a drive connection with a first positioning device, which has a first drive motor 4, by means of which the support 1 can be driven to rotate in the direction of the arrow 5 and can be positioned in accordance with a rotational position reference value signal provided by a control device 6. For this purpose, the first drive motor 5 is connected with a first position regulator integrated into the control device 6, which regulator has an encoder 7 for detecting a rotational position signal for the support 1. Using the first positioning device, the support 1 can be rotated continuously and without stopping, over almost any desired angles of more than 360° relative to the holder 3, about the axis of rotation 2.

The support 1 is furthermore in a drive connection with a second positioning device, which has a second drive motor 8, by means of which the support 1 can be displaced up and down in the direction of the double arrow 9, relative to the holder 3, and can be positioned in accordance with a height position reference value signal provided by the control device 6 (FIG. 19). Positioning can take place step by step or continuously. For this purpose, the second drive motor 10 is connected with a second position regulator integrated into the control device 6, which regulator has a position sensor 10 for detecting the height position of the support 1.

The invention claimed is:

1. A method for producing at least one solid-body layer in accordance with predetermined geometry data that are stored in a memory, wherein for dispensing material portions of a material that passes through nozzles onto a support and/or a solidified material layer situated on the support, at least one emitter array having multiple emitters, spaced apart from one another and configured as material-dispensing nozzles is provided, wherein the emitter array has multiple emitter columns in which center points of the emitters are offset relative to one another in a straight line, in each instance, wherein the support is rotationally positioned relative to the emitter array about an axis of rotation, and the material portions are applied to the support and/or to the solidified material layer situated on it the support by means of the emitters, and subsequently solidified, wherein the center point of the emitter of the emitter array that is farthest away from the axis of rotation has a first radial distance from the axis of rotation, and the center point of the emitter arranged closest to the axis of rotation has a second radial distance from the axis of rotation, wherein a trigger signal is generated that defines trigger points for the rotational position of the emitter array relative to the support, wherein an activation signal is generated and temporarily stored for the individual emitters as a function of geometry data stored in the memory and/or as a function of the position in which the emitter in question is arranged relative to the support when this emitter is positioned at the corresponding trigger point relative to the emitter array, wherein the emitters at the trigger points are controlled, in each instance, in such a manner that only those emitters in which the activation signal that was previously temporarily stored is set dispense material, wherein an angle between trigger points that are adjacent to one another is selected in such a manner that it corresponds to an angle that a first radial line and a second radial line enclose between them, wherein the first radial line runs from the axis of rotation to an intersection point between a first emitter column and a reference circle line that is concentric to the axis of rotation, and the second radial line runs from the axis of rotation to an intersection point between a second emitter column that is adjacent to the first emitter column in the circumferential direction of the axis of rotation and the reference circle line, wherein the radius of the reference circle line is less than the sum of 90% of the first radial distance and 10% of the second radial distance, and wherein the radius of the reference circle line is greater than the sum of 10% of the first radial distance and 90% of the second radial distance.

2. A method for producing at least one solid-body layer in accordance with predetermined geometry data that are stored in a memory, wherein a container is provided, in which at least one material layer composed of a liquid, paste-like or powder-form material is applied to a support, wherein for irradiation of the material with a radiation that solidifies the material, an emitter array having multiple radiation emitters that are spaced apart from one another and face the material layer are provided, wherein the emitter array has multiple emitter columns in which the center points of the emitters are offset from one another in a straight line, in each instance, wherein the support is rotationally positioned relative to the emitter array about an axis of rotation, and the radiation is directed onto the material layer, by means of the emitters, in such a manner that the material is solidified in at least one irradiation location, wherein a center point of the emitter of the emitter array that is farthest away from the axis of rotation has a first radial distance from the axis of rotation, and a center point of the emitter that is arranged closest to the axis of rotation has a second radial distance from the axis of rotation, wherein a trigger signal is generated, which defines trigger points for the rotational position of the emitter array relative to the support, wherein for the individual emitters, an activation signal is generated and temporarily stored as a function of the geometry data stored in the memory and/or as a function of the position in which the emitter in question is arranged relative to the support when this emitter is positioned at the trigger point, in each instance, relative to the emitter array, wherein the emitters are controlled at the trigger points, in each instance, in such a manner that only those emitters in which the previously temporarily stored activation signal is set emit radiation, wherein an angle between trigger points that are adjacent to one another is selected in such a manner that it corresponds to an angle that a first radial line and a second radial line enclose between them, wherein the first radial line runs from the axis of rotation to the intersection point between a first emitter column and a reference circle line that is concentric to the axis of rotation, and the second radial line runs from the axis of rotation to the center point between a second emitter column that is adjacent to the first emitter column in the circumferential direction of the axis of rotation and the reference circle line, wherein the radius of the reference circle line is less than the sum of 90% of the first radial distance and 10% of the second radial distance, and wherein the radius of the reference circle line is greater than the sum of 10% of the first radial distance and 90% of the second radial distance.

3. The method according to claim 1, wherein the radius of the reference circle line is less than the sum of 80% of the first radial distance and 20% of the second radial distance, and that the radius of the reference circle line is greater than the sum of 20% of the first radial distance and 80% of the second radial distance.

4. The method according to claim 1, wherein the radius of the reference circle line is less than the sum of 70% of the first radial distance and 30% of the second radial distance, and that the radius of the reference circle line is greater than the sum of 30% of the first radial distance and 70% of the second radial distance.

5. The method according to claim 1, wherein the radius of the reference circle line is less than the sum of 60% of the first radial distance and 40% of the second radial distance, and that the radius of the reference circle line is greater than the sum of 40% of the first radial distance and 60% of the second radial distance.

6. The method according to claim 1, wherein an emitter array is provided, which has at least two emitter columns arranged parallel to one another, in which the center points, in each instance, of the emitters that belong to the emitter column in question are offset in a straight line relative to one another.

7. The method according to claim 6, wherein an emitter column is assigned to each trigger point, in each instance, and that the activation signals provided for the individual trigger points are generated, in each instance, only for the emitters of the emitter column assigned to the trigger point in question, as a function of the geometry data stored in the memory and as a function of the position in which the emitter in question is arranged, and that the activation signals for the emitters not arranged in this emitter column are set in such a manner that these emitters are not activated when the emitter array is positioned at the trigger point relative to the support.

8. The method according to claim 6, wherein the emitter columns of the emitter array are arranged symmetrically relative to a radial plane that passes through the axis of rotation and a normal line to the axis of rotation, in such a manner that the emitter columns run parallel to this radial plane.

9. The method according to claim 1, wherein for imprinting print rings arranged concentrically relative to the axis of rotation, each delimited by means of an inner and an outer circular path, at least a first and a second emitter array are provided, that these emitter arrays are positioned relative to the axis of rotation in such a manner that the arithmetical average value of the inner and the outer circular path of the first emitter array differs from the arithmetical average value of the inner and the outer circular path of the second emitter array, that for generating the trigger signal of the first emitter array, a reference circle line having a first radius is used, and for generating the trigger signal of the second emitter array, a reference circle line having a second radius, deviating from the first radius, is used, and that the first radius is selected in accordance with claim 1, as a function of the first and second radial distance of the first emitter array, and the second radius is selected in accordance with claim 1 as a function of the first and second radial distance of the second emitter array.

10. The method according to claim 1, wherein at least two emitter arrays are provided, which are offset from one another by an angle of rotation with reference to the axis of rotation, and that the emitters of the individual emitter arrays are controlled, in each instance, in accordance with claim 1.

11. The method according to claim 1, wherein the center points of emitters that are adjacent to one another within the emitter columns are arranged at a constant first raster distance from one another, that emitter columns that are adjacent to one another are offset from one another at a constant second raster distance, in each instance, and that the first raster distance deviates from the second raster distance by less than 20 percent and agrees with it.

12. The method according to claim 1, wherein for producing a three-dimensional shaped object, multiple material layers of the material that passes through the nozzles are applied, one on top of the other, wherein the distance between the emitter array and the support is increased, in each instance, from layer to layer, by the thickness of the material layer last applied, and each material layer is solidified, in each instance, after being applied, before a further material layer is applied to this material layer.

13. The method according to claim 1, wherein for producing a three-dimensional shaped object, multiple material layers of a liquid, paste-like or powder-form material are solidified one on top of the other, by means of irradiation with the emitter array.

14. The method according to claim 11, wherein the first raster distance deviates from the second raster distance by less than 10 percent and agrees with it.

* * * * *

UNITED STATES PATENT AND TRADEMARK OFFICE
CERTIFICATE OF CORRECTION

Page 1 of 1

PATENT NO. : 12,017,412 B2
APPLICATION NO. : 17/604212
DATED : June 25, 2024
INVENTOR(S) : Hans Mathea It is certified that error appears in the above-identified patent and that said Letters Patent is hereby corrected as shown below:

On the Title Page

Column 1, Applicant, Lines 1-2, delete "dp polar GmbH, Eggenstein-Leopoldshafen (DE)" and insert -- 3D Systems GmbH, Morfelden-Walldorf (DE) --

In the Claims

Column 16, Line 58, Claim 1, delete "on it" and insert -- on --

Column 17, Line 34, Claim 2, delete "the center" and insert -- center --

Signed and Sealed this
Fourth Day of February, 2025

Coke Morgan Stewart
*Acting Director of the United States Patent and Trademark Office*